(12) United States Patent  
Smith et al.

(10) Patent No.: US 8,341,060 B2  
(45) Date of Patent: Dec. 25, 2012

(54) CORE/SATELLITE FINANCIAL PORTFOLIO DESIGN METHODOLOGY, SYSTEM AND COMPUTER READABLE MEDIUM

(75) Inventors: Eric S. Smith, Waterford, MI (US); Joseph Simko, Sterling Heights, MI (US)

(73) Assignee: Consulting Services Support Corporation, Troy, MI (US)

( * ) Notice: Subject to any disclaimer, the term of this patent is extended or adjusted under 35 U.S.C. 154(b) by 75 days.

(21) Appl. No.: 12/806,265

(22) Filed: Jul. 30, 2010

(65) Prior Publication Data

US 2012/0011080 A1    Jan. 12, 2012

Related U.S. Application Data

(60) Provisional application No. 61/273,075, filed on Jul. 30, 2009.

(51) Int. Cl.  
    *G06Q 40/00* (2012.01)
(52) U.S. Cl. ..................... 705/36 R
(58) Field of Classification Search ............ 705/36 R  
    See application file for complete search history.

(56) References Cited

U.S. PATENT DOCUMENTS

| | | |
|---|---|---|
| 2002/0032629 A1* | 3/2002 | Siegel et al. ............. 705/36 |
| 2004/0039675 A1 | 2/2004 | Wallman |
| 2006/0031149 A1 | 2/2006 | Lyons et al. |

* cited by examiner

*Primary Examiner* — Richard C Weisberger  
(74) *Attorney, Agent, or Firm* — Davis Miles McGuire Gardner PLLC

(57) ABSTRACT

Investment choices are each within a respective asset class of a defined set of asset classes. Investment choices of a first set of the investment choices (e.g., core investment choices) are within a particular asset class and have a performance factor value that is constrained by a performance factor value range defined by a filter structure. Investment choices of a second set of the investment choices (e.g., satellite investment choices) are within the particular asset class and have a performance factor value that may or may not be constrained by the performance factor value range of the first set, but may have a separate and distinct filter structure. The filter structure specifies unique characteristics desired of a set of investment choices, including a relationship between a benchmark performance factor value and a parameter used for determining the performance factor value range. The performance factor value of each investment choice and the performance factor value of the benchmark investment choice correspond to a common performance factor. A comparative assessment of each investment choice set is performed using a comparative assessment value for each one of the investment choices within each set of investment choices.

10 Claims, 22 Drawing Sheets

| Asset Class | Intended Allocation | Actual Allocation |
|---|---|---|
| Growth | 17.00% | 11.84% |
| World Equity | 10.00% | 7.99% |
| Growth & Income (G&I) | 24.75% | 24.23% |
| G&I - Core (C) | 16.50% | 17.03% |
| G&I - Satellite (S1) | 8.25% | 7.20% |
| General Bonds | 33.00% | 36.13% |
| General Bonds - Core (C) | 16.50% | 18.00% |
| General Bonds - Satellite 2 (S2) | 8.25% | 7.75% |
| General Bonds - Satellite 3 (S2) | 8.25% | 10.38% |
| Government Bonds | 7.00% | 8.50% |
| Commodities (Com) | 8.25% | 8.4% |
| Com - Core (C) | 6.19% | 6.56% |
| G&I - Satellite (S1) | 2.06% | 1.84% |

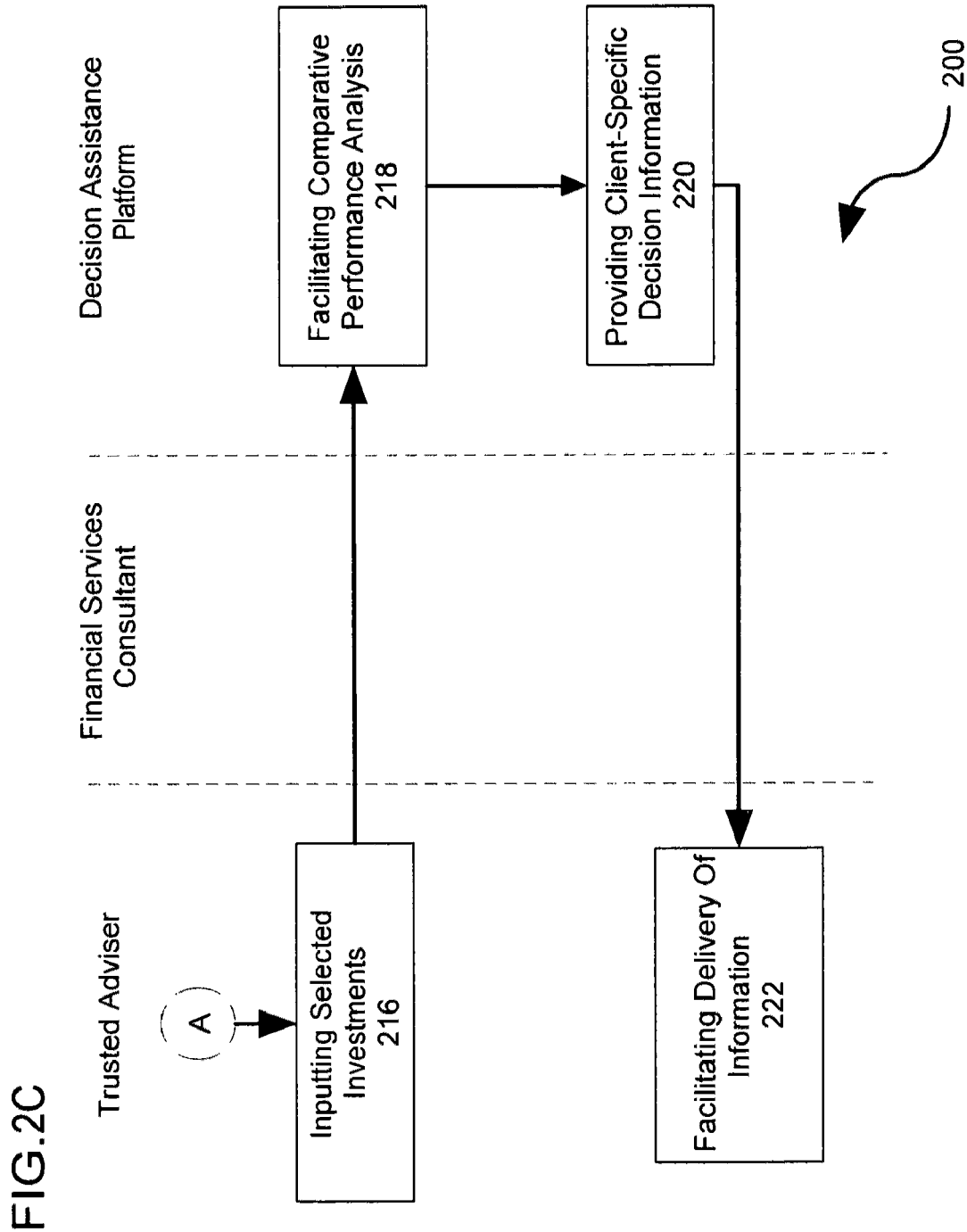

FIG. 3C

| Type | Metric | Cond 1 | Value 1 | Logical | Cond 2 | Value 2 |
|---|---|---|---|---|---|---|
| Force ▼ | Name ▼ | C ▼ | S&P 500 (comp) | ▼ | ▼ | |
| Exclude ▼ | Initial Purchase ▼ | > ▼ | 10000 | ▼ | ▼ | |
| Exclude ▼ | ASD 5-Year ▼ | BN ▼ | S&P 500 (comp) | AND ▼ | BP ▼ | 25 |

FIG. 3D

| Manager (rank) | Matched Managers For Filter Structure (Top Scores Shown) | | | | | |
|---|---|---|---|---|---|---|
| | 1-Yr Return | 3-Yr Ave Return | 5-Yr Ave Return | 1-Yr Std Dev | 3-Yr Ave Std Dev | 5-Yr Ave Std Dev | Comp Score |
| Investment Choice (1) | 26.60 | 13.29 | 10.13 | 20.28 | 13.69 | 12.83 | 8.5436 |
| Investment Choice (2) | 22.54 | 1.5 | 11.87 | 14.22 | 23.39 | 19.14 | 8.0234 |
| Investment Choice (3) | 25.16 | 0.62 | 11.66 | 14.69 | 24.58 | 20.11 | 7.8986 |
| Investment Choice (4) | 28.12 | 1.74 | 9.52 | 15.73 | 20.67 | 17.18 | 7.0893 |
| ... | ... | ... | ... | ... | ... | ... | ... |
| Investment Choice (378) | 20.99 | -8.69 | 0.31 | 15.43 | 20.57 | 16.65 | 6.2324 |

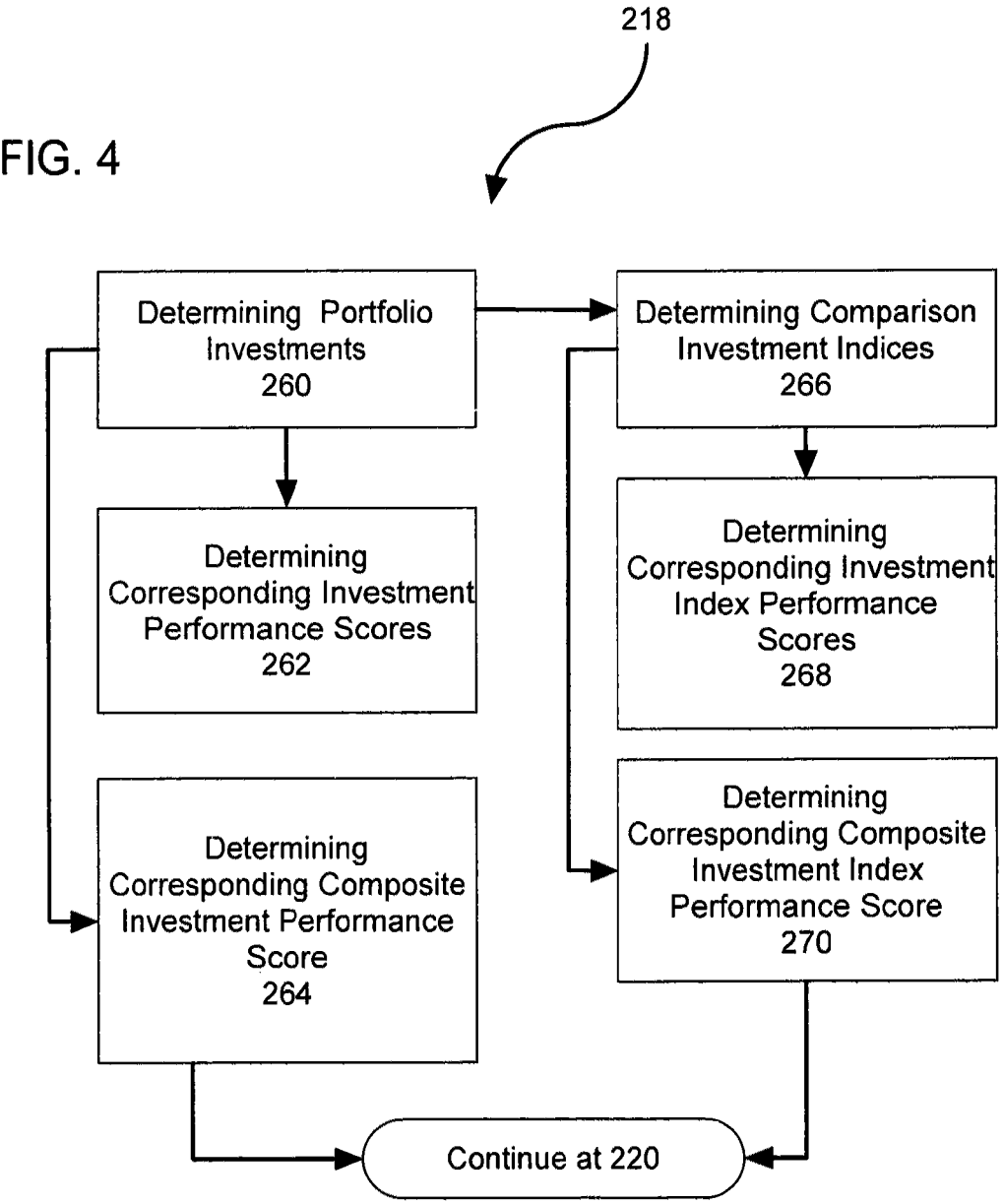

FIG. 6B

| Asset Class | Mutual Fund | Score | Relevant Index | Index Score | Difference |
|---|---|---|---|---|---|
| Aggressive Growth | Bridgeway Aggr Grth | 6.4080 | NASDAQ | 4.4731 | 1.9349 |
| Aggressive Growth | Meridian Value Fund | 6.8883 | NASDAQ | 4.4731 | 2.4152 |
| Growth | Fidelity Mid Cap Stk | 7.4375 | S&P | 6.1244 | 1.3131 |
| Growth | Growth Fund Of America | 7.0938 | S&P | 6.1244 | 0.9694 |
| Growth | White Oak Grth Fd | 5.1517 | S&P | 6.1244 | -0.9727 |
| Growth & Income | Ameristock Mutual Fund | 8.2398 | DJI | 7.5415 | 0.6983 |
| Growth & Income | Calamos Convertible G&I | 8.5636 | DJI | 7.5415 | 1.0221 |
| Growth & Income | Pimco Renaissance | 9.2307 | DJI | 7.5415 | 1.6892 |
| Taxable Bonds | Alliance Americas Gov Inc | 5.3365 | LBAB | 5.6634 | -0.3269 |
| Taxable Bonds | Blackrock Intl Bd | 5.5590 | LBAB | 5.6634 | -0.1044 |
| Taxable Bonds | Calvert Income | 5.9690 | LBAB | 5.6634 | 0.3056 |
| World Equity | Aim Gl Health Care | 6.5407 | EAFE | 3.9840 | 2.5567 |
| Composite | Your Portfolio | 7.3298 | Composite Index | 6.1672 | 1.1626 |

429 Managers In Asset Class-429 Managers Qualified For Further Analysis-Top Scores Shown Below

| Highest Ranked Managers (Period Ending 12/31/2003) | 5 Year Average Return | 5 Year Standard Deviation | 3 Year Standard Deviation | 3 Year Average Return | 1 Year Return | Composite Score |
|---|---|---|---|---|---|---|
| 1) SMH Cap Advs, Inc. (Diversified Fixed Income) | | | | | | 8.3493 |
| 2) Karpus Inv Mgt Co. (Fixed Income Mgt) | | | | | | 7.4163 |
| 3) Dreyfus Inv Advs, Inc. (Core Plus) | | | | | | 7.3889 |
| 4) Dwight Asset Mgt Co., Inc. (Active GIC/Stable Value Portfolio Mgmt) | | | | | | 7.3575 |
| 5) Fiduciary Cap Mgt, Inc. (Stable Value) | | | | | | 7.3469 |
| 6) Dodge and Cox (Dodge & Cox Fixed Income) | | | | | | 7.3176 |
| 7) Sample Manager (Fixed Income) | | | | | | 7.2785 |
| 8) Conseco Cap Mgt, Inc. (Core Plus Fixed Income) | | | | | | 7.2419 |
| 9) Galliard Cap Mgt, Inc. (Wells Fargo Stable Return Fund) | | | | | | 7.2379 |
| 10) Dwight Asset Mgt Co. (SEI Stable Asset Commingled Fund) | | | | | | 7.2377 |
| 11) Deutsche Asset Mgt (Core Plus Fixed Income (Full Discretion)) | | | | | | 7.2207 |
| 12) Sit Inv Asso., Inc. (Shrt Duration) | | | | | | 7.2143 |
| 13) Sun Cap Advisers (Private Placements Composite I) | | | | | | 7.2129 |
| 14) Taplin, Canida & Habacht (Domestic Fixed Income) | | | | | | 7.1976 |
| 15) Pacific Inv Mgt Co. (Moderate Duration-Core Plus Full Authority) | | | | | | 7.1899 |
| Other Rankings of Interest | | | | | | |
| 188) Lehman Brothers Aggregate Bond | | | | | | 6.7628 |

| 1,591 Funds In Asset Class-336 Managers Qualified For Further Analysis-Top 20 Shown Below | | | | | | | |
|---|---|---|---|---|---|---|---|
| Highest Ranked Funds | 1 Year Return | 3 Year Average Return | 5 Year Average Return | 1 Year Standard Deviation | 3 Year Standard Deviation | 5 Year Standard Deviation | Overall Score |
| 1) Matthews Korea | -32.12 | -4.90 | 13.75 | 22.98 | 36.11 | 45.83 | 8.3473 |
| 2) First Eagle Overseas/A | .93 | 6.22 | 8.55 | 13.13 | 12.18 | 12.85 | 8.2901 |
| 3) First Eagle Bibl Fd/A | -.12 | 6.91 | 6.77 | 11.75 | 10.16 | 10.29 | 7.9486 |
| 4) Commonwealth:New Zealand | 14.56 | 7.90 | 5.75 | 14.80 | 18.48 | 19.71 | 7.6639 |
| 5) MFS Intl New Discovery/A | -16.51 | -8.56 | 6.74 | 13.52 | 16.51 | 18.85 | 7.2749 |
| 6) Mutual European Fund/A | -18.43 | -5.23 | 4.74 | 10.89 | 11.36 | 15.37 | 6.9726 |
| 7) US Glob Acc:Regent East | 11.13 | .08 | 2.85 | 18.07 | 23.18 | 28.02 | 6.6369 |
| 8) MFS Global Total Return/A | -2.46 | -2.85 | 1.69 | 6.82 | 6.95 | 8.26 | 6.5835 |
| 9) Julius Baer:Intl Eqty/A | -14.19 | -15.44 | 4.22 | 12.51 | 13.29 | 20.94 | 6.5234 |
| 10) Mutual Discovery Fund/A | -16.76 | -2.74 | 1.83 | 10.49 | 9.88 | 12.15 | 6.4493 |
| 11) Fidelity Canada | -6.28 | -4.01 | 2.09 | 16.15 | 19.08 | 21.90 | 6.3558 |
| 12) Wm Blair:Intl Grth/N | -21.45 | -16.17 | 3.40 | 15.80 | 15.90 | 21.12 | 6.2576 |
| 13) RS:Contrarian/A | 5.89 | 4.19 | -.04 | 12.59 | 15.56 | 20.38 | 6.2086 |
| 14) AIM European Growth/A | -14.74 | -18.98 | 3.25 | 16.77 | 18.55 | 25.48 | 6.1173 |
| 15) Fidelity Global Balanced | -10.71 | -8.55 | .71 | 8.99 | 10.52 | 11.84 | 6.0905 |
| 16) Driehaus Emerg Mkts Grth | -23.05 | -17.30 | 3.51 | 15.32 | 22.23 | 30.17 | 6.0798 |
| 17) Tweedy Browne Bibl Value | -24.86 | -6.26 | .64 | 13.25 | 11.61 | 13.58 | 6.0060 |
| 18) Dreyfus Premier Emer Mk/A | -17.92 | -7.14 | 1.31 | 17.19 | 21.10 | 25.44 | 5.9589 |
| 19) CSI Equity Fund | -23.40 | -12.23 | 1.25 | 12.89 | 13.83 | 16.79 | 5.9405 |
| 20) Montgomery Emg Mkts Foc/R | -19.31 | -12.68 | 1.94 | 17.12 | 22.18 | 29.89 | 5.8742 |
| Other Rankings of Interest | | | | | | | |
| 21) Templeton Growth/A | -19.07 | -3.88 | -.25 | 17.01 | 13.73 | 16.59 | 5.8484 |
| 77) Fidelity Worldwide | -25.61 | -13.74 | -4.45 | 17.70 | 16.46 | 17.77 | 4.5760 |
| 100) MSCI World Index | -23.84 | -18.07 | -5.34 | 18.24 | 16.06 | 17.02 | 4.2877 |
| 130) Janus Overseas | -31.48 | -28.03 | -4.30 | 15.83 | 20.13 | 26.32 | 4.0551 |

CORE/SATELLITE FINANCIAL PORTFOLIO DESIGN METHODOLOGY, SYSTEM AND COMPUTER READABLE MEDIUM

CROSS REFERENCE TO RELATED APPLICATIONS

This patent application claims priority from U.S. Provisional Patent Application having Ser. No. 61/273,075 filed Jul. 30, 2009 entitled "Core/Satellite Portfolio Design Methodologies", having at least one common applicant herewith and being incorporated herein in its entirety by reference.

FIELD OF THE DISCLOSURE

The inventive disclosures made herein relate generally to financial consulting and more particularly to systems and methods configured for providing financial consulting services.

BACKGROUND

Financial portfolios are designed by blending various classes of investment assets (i.e., asset allocation for blending asset classes). This blending of asset classes is done in the hope that the blended composite will produce the highest potential return at an amount of risk within the risk tolerance of the client. Methodologies employed for performing asset allocation for blending asset classes make use of the average returns and volatility of such returns of the various asset classes. In addition, such methodologies can make use of historical correlation of the fluctuations in value of such classes relative to each other. It is important to understand that the composite risk exposure of a client's overall portfolio, as designed, is the product of the correlation of the risk exposures of the various asset classes of which that portfolio is comprised. But, as implemented (i.e., as the portfolio takes its final, implemented form as a result of the selection of managers within each of the asset classes comprising the portfolio's design), the risk exposure can, and very often will, be different (e.g., higher or lower) than the theoretical risk exposure of the portfolio as designed. Because of this, the manager selection process is a critical part of trying to ensure that portfolio performance is truly being optimized at any given level of risk acceptable to the client.

FIGS. 1A and 1B illustrate how the risk exposure of a portfolio as-implemented can and very often will be different than the theoretical risk exposure of the portfolio as-designed. As illustrated in FIG. 1A, the current asset allocation depicted in the as-designed risk/return graph 102 was relatively volatile with a lower historic return than other portfolios of similar or substantially less volatility (e.g., Mix 1, Mix 2, Mix 3). This, however, was for the portfolio as-designed as opposed to as-implemented. As shown in FIG. 1B, as-implemented, this portfolio presented a different picture entirely, as depicted in the as-implemented risk/return graph 104. In particular, it should be noted how much more conservative the portfolio was as-implemented (e.g., see "Current Managers"). Interestingly, even T-Bills appeared to offer higher long-term returns with much less risk. The volatility of the average returns of each asset class effectively defines a "risk budget" of that class, and FIG. 1B illustrates why it is important to understand what this means in practice. Notice that the difference between the risk/return position of the portfolio as-designed (i.e., "Current Allocation") and the portfolio as-implemented (i.e., "Current Managers") was due to the fact that all or a significant portion of the portfolio's current managers were not fully utilizing their risk budgets. FIG. 1C shows an example of a portfolio's designed asset allocation blend. The major divisions of the pie chart represent the allocation to each asset class, and the layered subsections represent allocations to core and satellite within each asset class. FIG. 1D shows an example of a portfolio's designed asset allocation blend. The major divisions, in bold, represent the allocation to each asset class, and the subsections, in italics, represent allocations to core and satellite within each asset class.

It is known that there can be chronic underperformance caused by managers with lower than benchmark returns and also lower than benchmark volatilities. This could be especially true in up market years such as those proceeding 2008. In such up market years, the poor performance could often be the result of flawed manager selections because, in such cases, the managers selected typically were not using the full "risk budget" of their respective asset classes (i.e., the amount of risk exposure that the client had implicitly accepted by including those asset classes as a part of the client's overall portfolio). In other words, these managers appeared to be too conservative. They were not taking risks at the level the client had implicitly accepted, and were under-performing as a result.

This all seemed to make perfect sense until the bottom dropped out of the global financial markets in 2008. At that point, what was seen was that managers with lower volatility were quite often losing less value than their peers and benchmarks. Their lower volatilities, which had often appeared to be a cause of significant underperformance in prior up market periods, were producing better than index performance in the then current down market periods. Conversely, exceptional managers in up market periods were, in many cases, unable to adapt quickly enough to down market conditions or unable to adapt at all, sometimes due to restrictions in their published investment mandates to preserve prior gains. Consequently, exceptional managers in up market periods often proved to be less than exceptional in down market periods and vice versa. The often higher than benchmark volatilities that characterized "top performers" in up market periods tended to produce larger than benchmark losses as the markets dropped and, as was demonstrated in the up market years that preceded 2008, lower than benchmark volatilities tended to produce lower than benchmark returns as markets rose.

Therefore, a systematic and dynamic approach for dampening the downside potential of client portfolios without overly constraining the upside potential of the portfolio is useful and advantageous with respect to the performance of a portfolio as-implemented.

SUMMARY OF THE DISCLOSURE

Embodiments of the present invention provide a systematic and dynamic approach for dampening the downside potential of client portfolios without overly constraining the upside potential of the portfolio. More specifically, embodiments of the present invention use active core/satellite portfolio design methodologies to aid in fine-tuning overall portfolio risk exposure/volatilities. The intended investment effect from such fine-tuning is the optimization of the portfolio's risk/return profile through changing market conditions. In this manner, designing and implementing a portfolio in accordance with the present invention provides for potentially higher high returns in up markets periods and potentially higher low returns (for reduced losses) in down market periods with respect to a portfolio's benchmark or indices.

In one embodiment of the present invention, a method for providing a core-satellite analysis of investment choices comprises at least one data processing device of a data computing system accessing, from memory coupled to the at least one data processing device, instructions causing the at least one data processing device to perform a plurality of operations. The instructions cause the at least one data processing device to perform an operation for providing a plurality of investment choices. Each one of the investment choices is within at least one asset class of a defined set of asset classes. The instructions cause the at least one data processing device to perform an operation for determining a first set of the investment choices. Causing the at least one data processing device to determine the first set of the investment choices includes causing the at least one data processing device to determine which ones of the investment choices have a filter function metric value (e.g., a performance factor value) that falls outside of at least one of an upper limit and a lower limit of a filter function metric value range defined by a dynamic range filter structure. The dynamic range filter structure specifies a relationship between a filter function metric value of a benchmark investment choice and at least one parameter used for deriving the filter function metric value range. The filter function metric value of each one of the investment choices of the first set of the investment choices and the filter function metric value of the benchmark investment choice correspond to a common filter function metric. The instructions cause the at least one data processing device to perform an operation for determining a second set of the investment choices. Causing the at least one data processing device to determine the second set of the investment choices includes causing the at least one data processing device to determine which ones of the investment choices have a filter function metric value that falls within the upper limit and the lower limit of the filter function metric value range defined by the dynamic range filter structure. The filter function metric value of each one of the investment choices of the second set of the investment choices and the filter function metric value of the benchmark investment choice correspond to the common filter function metric. The instructions cause the at least one data processing device to perform an operation for performing a comparative assessment (e.g., comparative performance assessment) of each one of the sets of investment choices. Causing the at least one data processing device to perform the comparative assessment of each one of the sets of investment choices includes causing the at least one data processing device to determine a comparative assessment value for each one of the investment choices thereof.

In another embodiment of the present invention, a system for objectively quantifying investment choices comprises at least one data processing device, instructions processable by the at least one data processing device, and an apparatus from which the instructions are accessible by the at least one data processing device. The instructions are configured for causing the at least one data processing device to perform asset allocation for providing a blend of asset classes, specify a benchmark investment choice for each one of the asset classes, identify source of available investment choices, wherein each one of the investment choices is in at least one of the asset classes, provide a dynamic range filter structure that specifies a relationship between a filter function metric value of the benchmark investment choice and at least one parameter used for deriving a filter function metric value range, apply the dynamic range filter structure to a filter function metric value of each one of the investment choices, and perform a comparative assessment (e.g., comparative performance assessment) of each one of the filtered investment choices. The dynamic range filter structure is applied to a filter function metric value of each one of the investment choices in a manner such that the relationship between the filter function metric value of the benchmark investment choice and the at least one parameter used for deriving a filter function metric value range causes filtered investment choices to be identified as those ones of the investment choices having a filter function metric value that falls within upper and lower limits of a filter function metric value range defined by the dynamic range filter structure. The filter function metric value of each one of the investment choices and the filter function metric value of the benchmark investment choice correspond to a common filter function metric. The comparative assessment is at least partially based on a comparative assessment value for each one of the filtered investment choices and the comparative assessment value allows for quantitative assessment of each one of the investment choices with respect to each other one of the investment choices.

In another embodiment of the present invention, a non-transitory computer-readable storage medium has tangibly embodied thereon and accessible therefrom instructions interpretable by at least one data processing device. The instructions are configured for causing the at least one data processing device to perform a plurality of operations. An operation is performed for providing a plurality of investment choices. Each one of the investment choices is within at least one asset class of a defined set of asset classes. An operation is performed for providing a dynamic range filter structure that specifies a relationship between a performance factor value of a benchmark investment choice and at least one parameter used for deriving a performance factor value range. An operation is performed for applying the dynamic range filter structure to a performance factor value of each one of the investment choices such that the relationship between the performance factor value of the benchmark investment choice and the parameter used for deriving a performance factor value range filters to determine which ones of the investment choices have a performance factor value that falls within upper and lower limits of a performance factor value range defined by the dynamic range filter structure. The performance factor value of each one of the investment choices and the performance factor value of the benchmark investment choice correspond to a common performance factor. An operation is performed for performing a comparative assessment (e.g., comparative performance assessment) of each one of the filtered investment choices. The comparative assessment is at least partially based on a comparative assessment value for each one of the filtered investment choices and the comparative assessment value allows for quantitative assessment of each one of the investment choices with respect to each other one of the investment choices.

In yet another embodiment, a performance report depicting a comparative investment choice performance assessment is made by a method comprising outputting a plurality of core investment choices and outputting a plurality of satellite investment choices. Each one of the core investment choices is defined by a first filter structure as being a qualified core investment choice for an investment portfolio. A value for a particular metric for each one of the qualified core investment choices is between upper and lower values filter function metric values determined dependent upon a value of the particular metric for a benchmark investment choice defined by the filter structure. Each one of the satellite investment choices that are each determined using a second filter structure different than the first filter structure. The core investment choices and the satellite investment choices are from a common asset class.

These and other objects, embodiments, advantages and/or distinctions of the present invention will become readily apparent upon further review of the following specification, associated drawings and appended claims.

BRIEF DESCRIPTION OF THE DRAWINGS

FIGS. 2B and 2C shows a method for facilitating financial consulting services in accordance with embodiments of the disclosures herein and in view of the information flow schematic depicted in FIG. 2A.

FIG. 3C Row three of the table, shows a dynamic range filter structure configured in accordance with the present invention.

FIG. 3D shows the resulting investment choice data set to which a filter structure, configured in accordance with the present invention, has been applied and investment choices have been comparatively evaluated

FIG. 4 depicts an embodiment of the operation for facilitating the comparative performance analysis of the investment portfolio depicted in FIG. 2C.

FIGS. 6A and 6B jointly depict an alternate embodiment for presenting the information depicted in the chart of FIG. 5.

FIG. 7A depicts a table having a plurality of multi-segment bars that graphically represent performance information for performance-quantified investment choices.

FIG. 7B depicts a table comprised by tabular data representing performance information for performance-quantified investment choices.

DETAILED DESCRIPTION OF THE DRAWING FIGURES

Figure 1A:
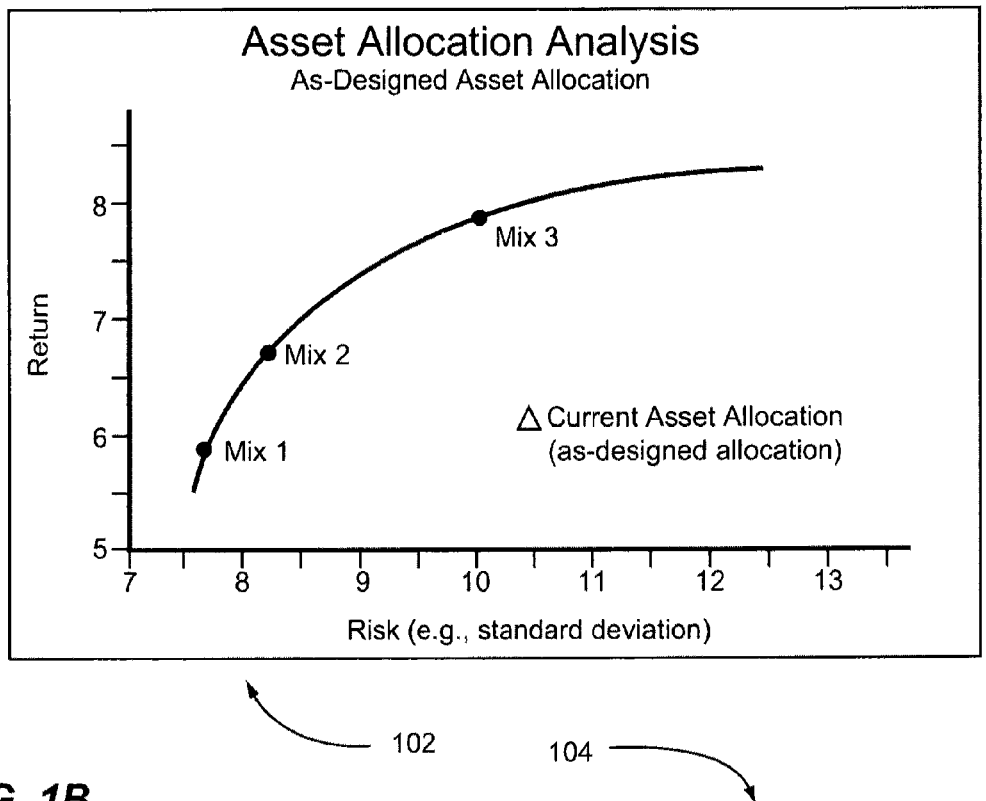
FIG. 1A shows an Efficient Frontier (as-designed risk/return) graph for various asset class blends (e.g., Mix 1, Mix 2, Mix 3) with the current portfolio's as designed asset allocation blend.
Figure 1B:
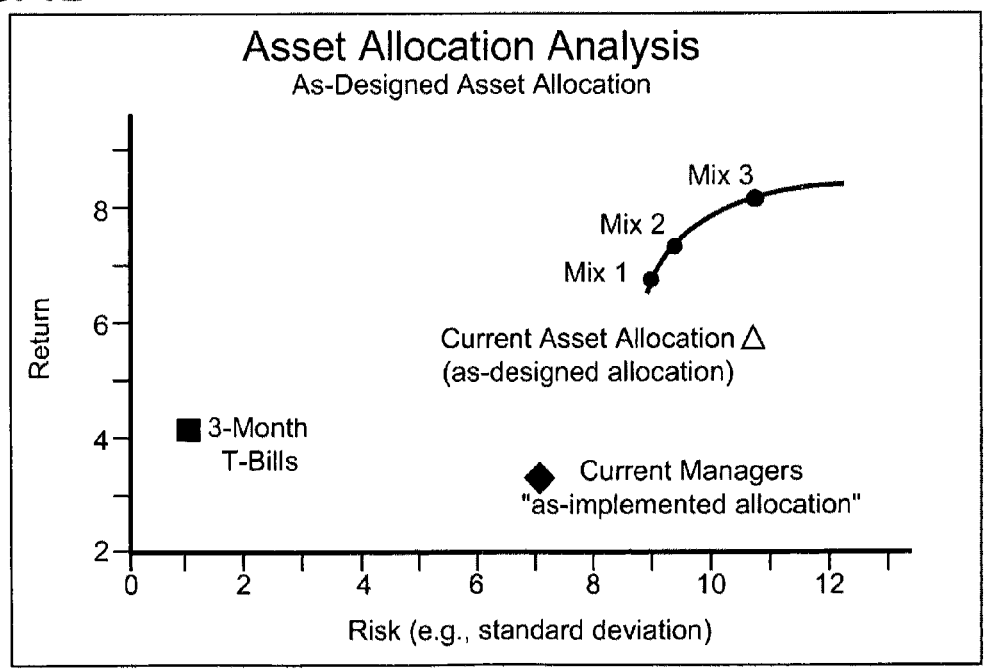
FIG. 1B shows an Efficient Frontier (as-designed risk/return) graph for various asset class blends with the current portfolio's as-designed asset allocation blend; and against the blend of investment manager choices (as-implemented allocation) used in the current portfolio; and against the 3-Month T-Bill benchmark.
Figures 1C, 1D:
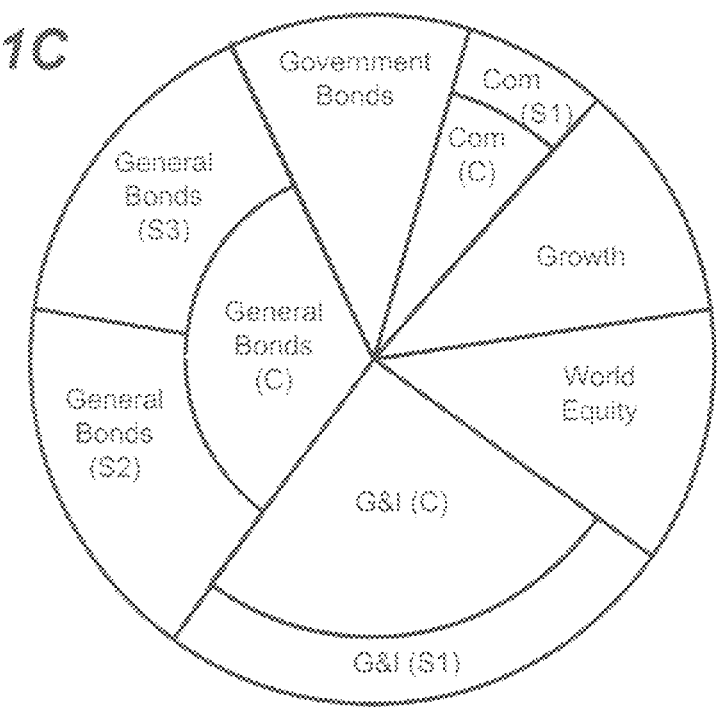
FIG. 1C shows a layered pie chart depicting a portfolio's designed asset allocation blend.
FIG. 1D shows a numerical representation of a portfolio's designed asset allocation blend.
Figure 2A:
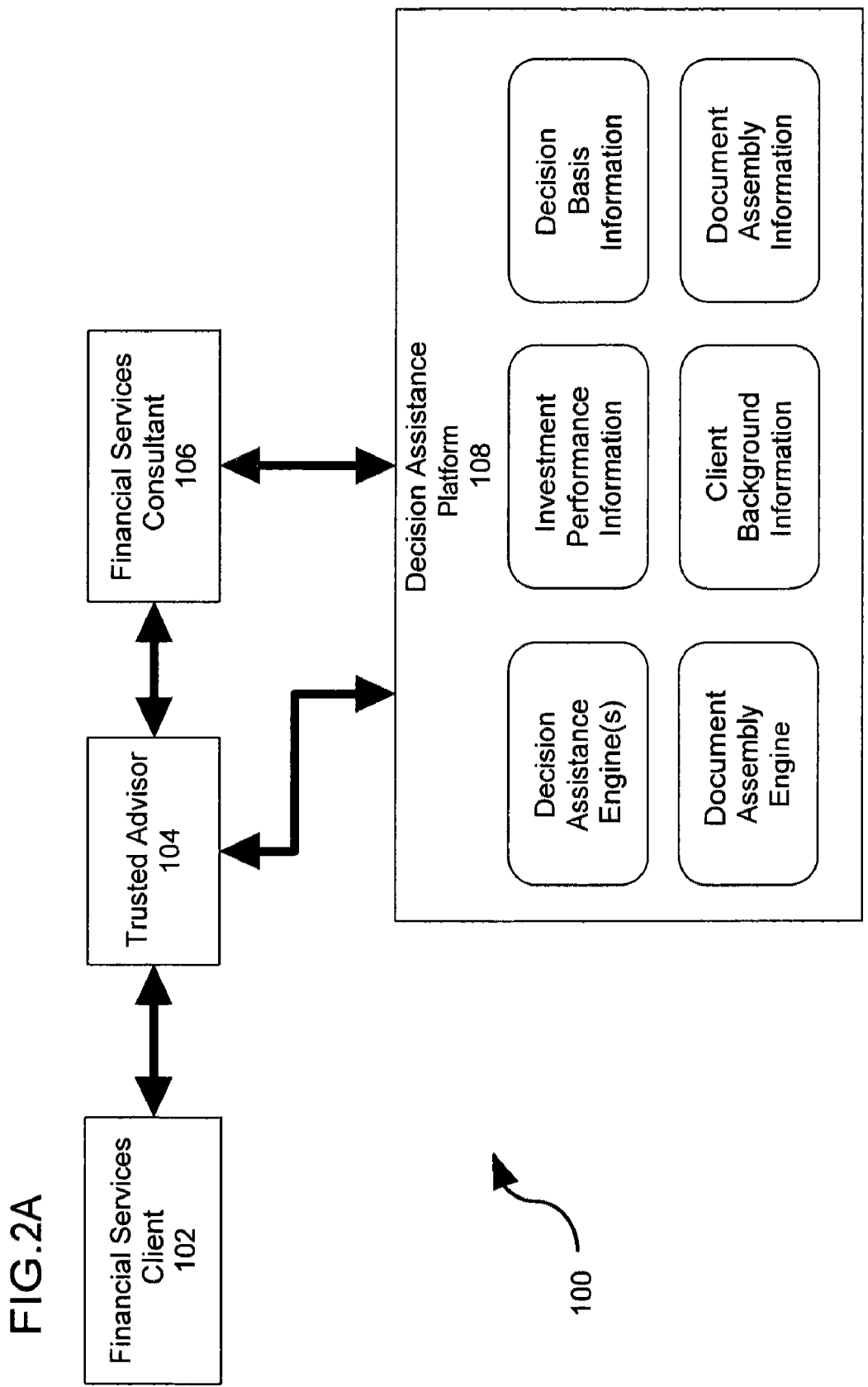
FIG. 2A shows an information flow schematic in accordance with an embodiment of the inventive disclosures made herein.

An embodiment of an information flow schematic 100 in accordance with the inventive disclosures made herein is depicted in FIG. 2A. Entities within the information flow schematic include a financial services client 102, a trusted advisor 104 (i.e., an affiliated trusted advisor), a financial services consultant 106 and a decision assistance platform 108 (i.e., a system). Communication of information (e.g., client background information and/or client-specific consulting information) is carried out between the financial services client 102 and the trusted advisor 104. Similarly, communication of information (e.g., client background information and/or client-specific consulting information) is carried out between the trusted advisor 104, the financial service consultant 106 and the decision assistance platform 108.

In the embodiment of the information flow schematic 100 depicted in FIG. 2A, the trusted advisor 104 is a separate person/entity from the financial services consultant 106 and can isolate the financial services client 102 from direct interaction with the financial services consultant 106 and the decision assistance platform 108. In another embodiment (not specifically shown), the trusted advisor 104 and the financial services consultant are the same person (e.g., an attorney, CPA or family member), whereby that same person isolates the financial services client 102 from in-depth and/or direct interaction with the decision assistance platform 108. In still another embodiment (not specifically shown), the trusted advisor 104 and the financial services consultant are different persons acting on behalf of the financial services client 102 from within a common organization (e.g., an attorney and CPA employed by a common local, national or international consulting firm), whereby the common organization isolates the financial services client 102 from in-depth and/or direct interaction with the decision assistance platform 108. In yet another embodiment (not specifically shown), the financial services client 102 serves as his or her own trusted advisor and financial services consultant, whereby the financial services client 102 directly interacts with the decision assistance platform 108.

It is disclosed herein that interaction and communication between the financial services client 102, the trusted advisor 104 (i.e., an affiliated trusted advisor), the financial services consultant 106 and/or the decision assistance platform 108 may be implemented via a networked computer system. For example, via the network system 400 depicted in FIG. 9, such interaction and communication may be facilitated via a networked computer system. The Internet is one embodiment of such a networked computer system. As such, it is disclosed herein that a website may be provided for enabling such interaction and communication. Specific examples of such interaction and communication include, information acquisition functionality (e.g., receiving background information from the client), service payment functionality (electronically receiving payment for services), distributed processing functionality (e.g., where various decision assistance functionality is performed in a distributed manner), consulting information delivery functionality (e.g., providing client-specific consulting information such as objectively-quantified investment choices and client-specific reports to the client and/or trusted advisor), etc.

The decision-assistance platform 108 accesses and/or is provided information about, for example, the client (e.g., the client's life circumstances, investment preferences, financial position, financial goals, risk tolerances, etc.), decision basis information (including, without limitation, asset allocation technology and rule set), investment performance information (both with regard to all available product or manager choices and client-specific, historic performance information) and document format template information for performing associated decision assistance functionality. In one embodiment, information utilized in carrying out decision assistance functionality as disclosed herein (e.g., manually and/or by a decision assistance platform) is stored in and accessible from one or more databases. Examples of decision assistance functionality, as discussed below in greater detail, include inputting, compiling and/or determining information comprised by a client-specific template and determining client-specific consulting information (e.g., determining client-specific investment choices) at least partially dependent upon decision basis information. Examples of such decision basis information include information relating to prescribed decision-making rules, information relating to investment effect selection and information relating to correlating investments opportunities to client financial needs, desires and/or goals. Examples of investment performance information include information associated with returns on an investment, information associated with risk of an investment, information associated with other performance and structural characteristics of an investment (e.g., manager tenure, turnover ratio, internal fee/cost structures, etc.) and information associated with compiling comparative analyses of performance and structural data. Examples of document format information include information associated with formatting prescribed documents, content included within prescribed documents and information associated with outputting information related to making investment choices (e.g., creating a printed document including such information and/or displaying such information). Decision basis information, investment performance information, and document format information are examples of client-specific consulting information in view of a particular client and facilitating decision assistance functionality in accordance with the inventive disclosures made herein.

In accordance with at least one embodiment of the inventive disclosures made herein, decision assistance functionality disclosed herein is carried out by a decision assistance platform that comprises a first decision engine (e.g., a rules-based expert system with a decision engine interface) and a second decision engine (e.g., a investment selection optimization system). The first decision engine facilitates creation of a client-specific template that represents a client-specific profile comprising various information (e.g., rules, data sets, processing instructions, performance criteria, etc). Examples of such information comprised by the client-specific template include performance weightings and factors (e.g., parameters corresponding to investment effects desired by the client), defined data and/or datasets, logic conditional filters for designating manipulation (e.g., refining/slimming datasets) of datasets, and processing instructions. The processing instructions represent information that enables tasks such as proper utilization of factors, weightings and filters to be facilitated, that enables document assembly functionality to be facilitated (e.g., automated report generation) and information related to recursive analysis/assessment of investment information. Information comprised by the client-specific template is utilized by the second decision engine to facilitate scoring and ranking processes for optimizing investment selection (i.e., generating ranked listings of investment choices) in a manner consistent with a client's individual needs, goals and desires. Such instructions include information relating to appropriate percentage allocation of investments among available asset classes (i.e., the asset allocation), to appropriate blending of performance factors and/or to appropriate weighting of such factors. The scoring and ranking processes includes enabling assessment of investment choices in a manner that is intended to aid a client in identifying which money management teams have historic performance that most closely matches the investment experiences that the client desires (i.e., the investment effect the client desires).

It is disclosed herein that a person may perform, in a manual fashion, certain decision assistance functionality disclosed herein as being facilitated by the decision assistance platform rather than such functionality being performed by the decision assistance platform. In one example, functionality disclosed herein as being facilitated by the first decision engine of the decision assistance platform is at least partially facilitated by a person in a manual manner (e.g., with the decision engine interface) and resulting information is subsequently made available to the decision assistance platform for enabling functionality of the decision assistance platform to be facilitated (e.g., functionality facilitated by the second decision engine of the decision assistance platform). In one specific example, client-specific template information is at least partially generated in a manual manner rather than by a decision engine of the decision assistance platform. Accordingly, it is disclosed herein that all or a portion of the operation performed by the first decision assistance engine and/or the second decision assistance engine can be performed manually (e.g., by a financial services consultant, investor, or other person).

Figure 2B:
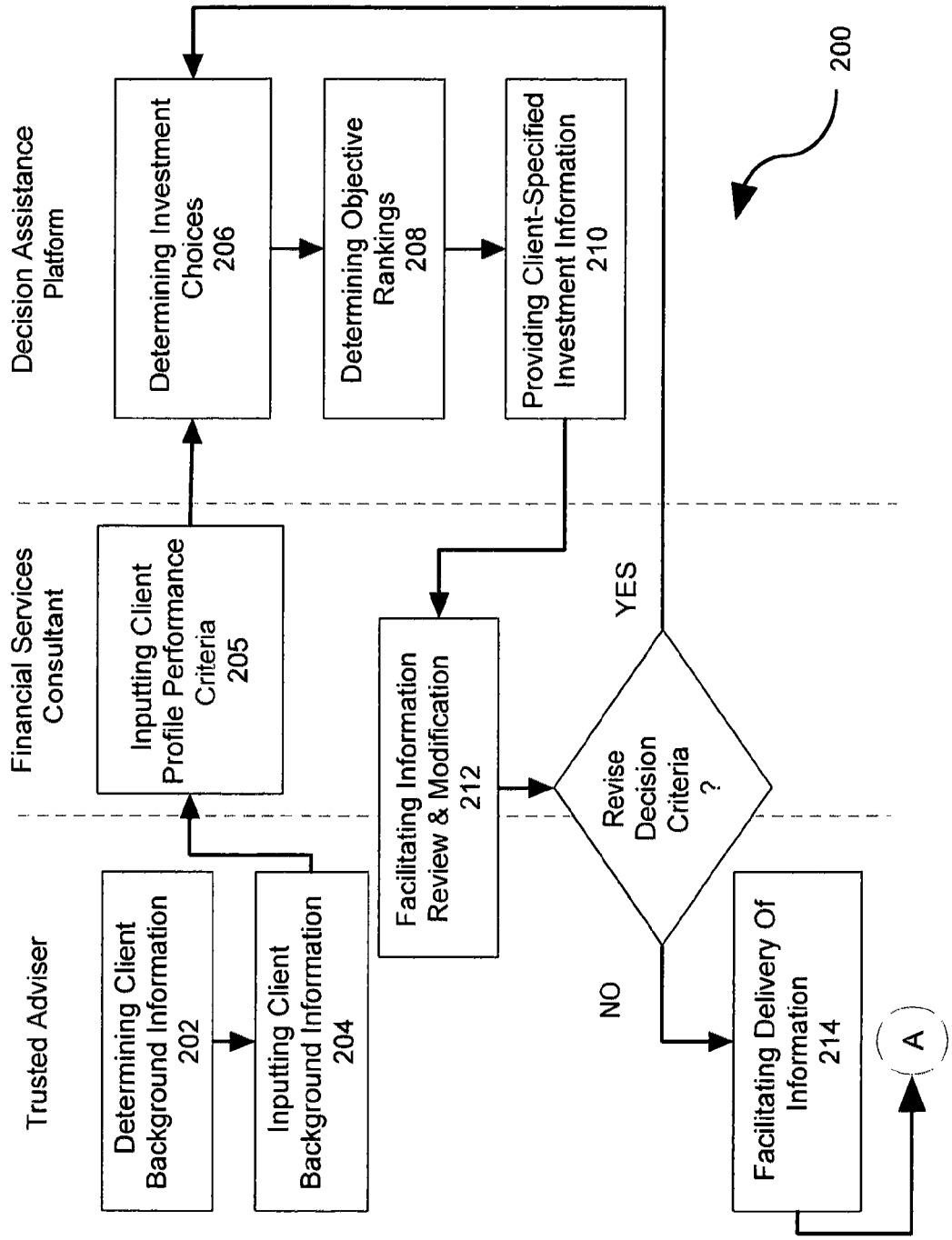

FIGS. 2B and 2C depict a method 200 for facilitating financial consulting services in accordance with embodiments of the disclosures herein and in view of the information flow schematic 100 depicted in FIG. 2A. An operation 202 is performed for obtaining client background information, such as in response to a meeting with the financial services client (or the direct determination of such information by the client himself or herself). After obtaining the client background information, an operation 204 is performed for inputting relevant and/or required client background information into a decision assistance platform. Inputting such information is an embodiment of enabling access of such information.

In response to inputting the client financial objectives, the financial services consultant performs an operation 205 for inputting client profile performance criteria and, thereafter, the decision assistance platform performs an operation 206 for determining investment choices (e.g., an appropriate asset allocation) that correspond to the client financial objectives. After determining the investment choices (e.g., asset allocation), the decision-assistance platform performs an operation 208 for determining an objective ranking (i.e., an objective quantification) of the computed investment choices (i.e., an operation that objectively scores and ranks (e.g., comparative assessment values that may be quantitative), in a manner specific to that client, all available investment choices within the various asset classes of investment choices computed in operation 206), thereby producing objectively ranked investment choices. In at least one embodiment of the inventive disclosures made herein, determining the objective ranking includes objectively and client-specifically determining a performance score (discussed below in greater detail) for each of the investment choices and ranking the investment choices dependent upon information determined from the client-specific performance scores.

In one embodiment, determining the investment choices includes applying a logic conditional filter to at least one of potentially many performance and structural factors expressed as numeric information, alphanumerical information and/or date information. For example, such a conditional filter is used for omitting funds that are closed (i.e., not accepting investments from new investors), or that have other structural or situational characteristics (i.e., factors) that are not desired or appropriate (e.g., minimum investment amount exceeds an investment amount prescribed) for a client. In one embodiment, determining investment choices includes determining the investment choices dependent upon information determined from different aspects of the client-specific template (i.e., different client-specific template information). Such determining is, in at least one embodiment of the inventive disclosures made herein, performed by a first decision engine of the decision-assistance platform, whereby resulting information compiled by the first decision engine is subsequently provided to the second decision engine of the decision-engine platform, thus enabling a scoring and ranking process to be carried out by the second decision engine. In one embodiment, the client-specific template includes one or more of potentially many filters and weightings, with one or more of the filters and weightings being applied to performance factor information, client information, investment opportunity information, and/or investment performance information.

After determining the objective ranking, the decision assistance platform performs an operation 210 for providing client-specific consulting information (e.g., investment choices, objective quantification thereof, etc). In one embodiment, such providing the client-specific consulting information includes preparing and outputting a client-specific investment report by a document assembly engine of the decision-assistance platform. In another embodiment, such providing the client-specific consulting information includes visually displaying such information. In still another embodiment, such providing includes making such information accessible for related operations (not necessarily or specifically shown) of the method 200. Accordingly, it is disclosed herein that the decision assistance platform is preferably configured for preparation and output of information as printed and/or electronic documents (i.e., reports that are configured for being printed and/or electronically displayed).

A client-specific investment report as disclosed herein documents client-specific consulting information such as objectively ranked investment choices. Such client-specific consulting information (e.g., objectively ranked investment choices) is, preferably, presented in view of multiple variables that are dependent upon information determined from the financial objectives of the client. For example, various scenarios of investment choices may be presented that are dependent upon information determined from a plurality of desired investment effects and related computed performance scores. Such investment effects are dependent upon information determined from performance criteria. Broadly, performance criteria in accordance with the inventive disclosures made herein include criteria relating to return, risk, associated industry-prescribed asset classes, investment effect rules and correlating investments opportunities to client expectations. Specific examples of performance criteria and their related performance factors are depicted below in Table 1, which are not intended to be inclusive. Detailed information defining such performance criteria and their related performance factors are not discussed in detail, but would be understood by a person skilled in the related art (e.g., financial systems and methodologies).

TABLE 1

Performance Criteria and related Performance Factors

| Performance Criteria | Related Performance Factors |
|---|---|
| Annualized Return | N-Year Return, N-Year Average Return |
| Annualized Standard Deviation | N Year Standard Deviation |
| Index | Index Score, Composite Index Score |
| Yield | N-Year Yield |
| Alpha (or Beta) | N-Year Alpha (or N-Year Beta) |
| Market Capitalization | Average Market Capitalization |
| Sharpe Ratio | N-Year Sharpe Ratio |
| Turnover Ratio | N-Year Turnover Ratio |
| Treynor Ratio | N-Year Treynor Ratio |

In at least one embodiment of the client-specific investment report, the client-specific investment report includes charts and tables depicting investment allocation among various asset classes, statistical/historical performance of investment choices within various asset classes, distribution of composite performance scores for such investment choices, and client-specific scoring and ranking of such investment choices. In at least one embodiment, the client-specific investment report includes a client-specific assessment of available investment alternatives dependent upon information determined from an assessment of such available investment alternatives.

After reviewing the client-specific consulting information, the trusted advisor and/or the financial services consultant (in consultation with the client) may facilitate an operation 212 for revising decision criteria upon which the objective ranking of investment choices is based. Such revisions include revisions to performance criteria (e.g., factor selections and weightings) and modifying/clarifying information associated with client financial objectives. In response to the trusted advisor and/or the financial services consultant revising any of the decision criteria, the method continues at the operation 206 for determining investment choices an objective-ranking (i.e., operation 208) dependent upon information determined from the revised criteria. In response to neither the trusted advisor nor the financial services consultant revising any of the decision criteria, the method continues at an operation 214 for facilitating delivery of the client-specific consulting information (e.g., in the form of a client-specific investment report) to the financial services client (e.g., the trusted advisor initiating electronic submission of the information by the decision assistance platform or the trusted advisor personally facilitating presentation of the information). After the financial services client selects one or more investment choices (e.g., after consultation with the trusted adviser and/or the financial services consultant), an operation 216 is performed (e.g., by the trusted advisor or financial services client) for inputting the selected investment choices into the decision assistance platform. All selected investment choices represent an investment portfolio of the financial services client.

Periodically (e.g., quarterly), an operation 218 is performed via the decision-assistance platform for facilitating a comparative performance assessment of the investment portfolio, thereby generating periodic performance information (based upon client-specific decision information). As discussed below in greater detail, the comparative performance assessment provides information for comparatively (e.g., qualitatively and objectively) assessing selected investment choices. After facilitating the comparative performance assessment of the investment portfolio, the decision assistance platform performs an operation 220 for providing such client-specific decision information for subsequent operations. One example of enabling such subsequent operations includes outputting of a periodic performance report comprising such periodic performance information at the request of the trusted adviser financial services consultant, and/or the client. In one embodiment, the periodic performance report is prepared and outputted by a document assembly engine of the decision-assistance platform. After performing the operation 220 for providing such client-specific decision information, the trusted advisor or financial services client performs an operation 222 for facilitating providing such information for review by the financial services client.

Preferably, a decision assistance platform as disclosed herein plays no role between the trusted advisor and the financial services client. However, in other embodiments, a decision assistance platform as disclosed herein does play a role between the trusted advisor and the financial services client. For example, the decision assistance platform may facilitate compilation of information directly from the financial services client or may provide investment choice information directly to the financial services client.

Figure 3A:
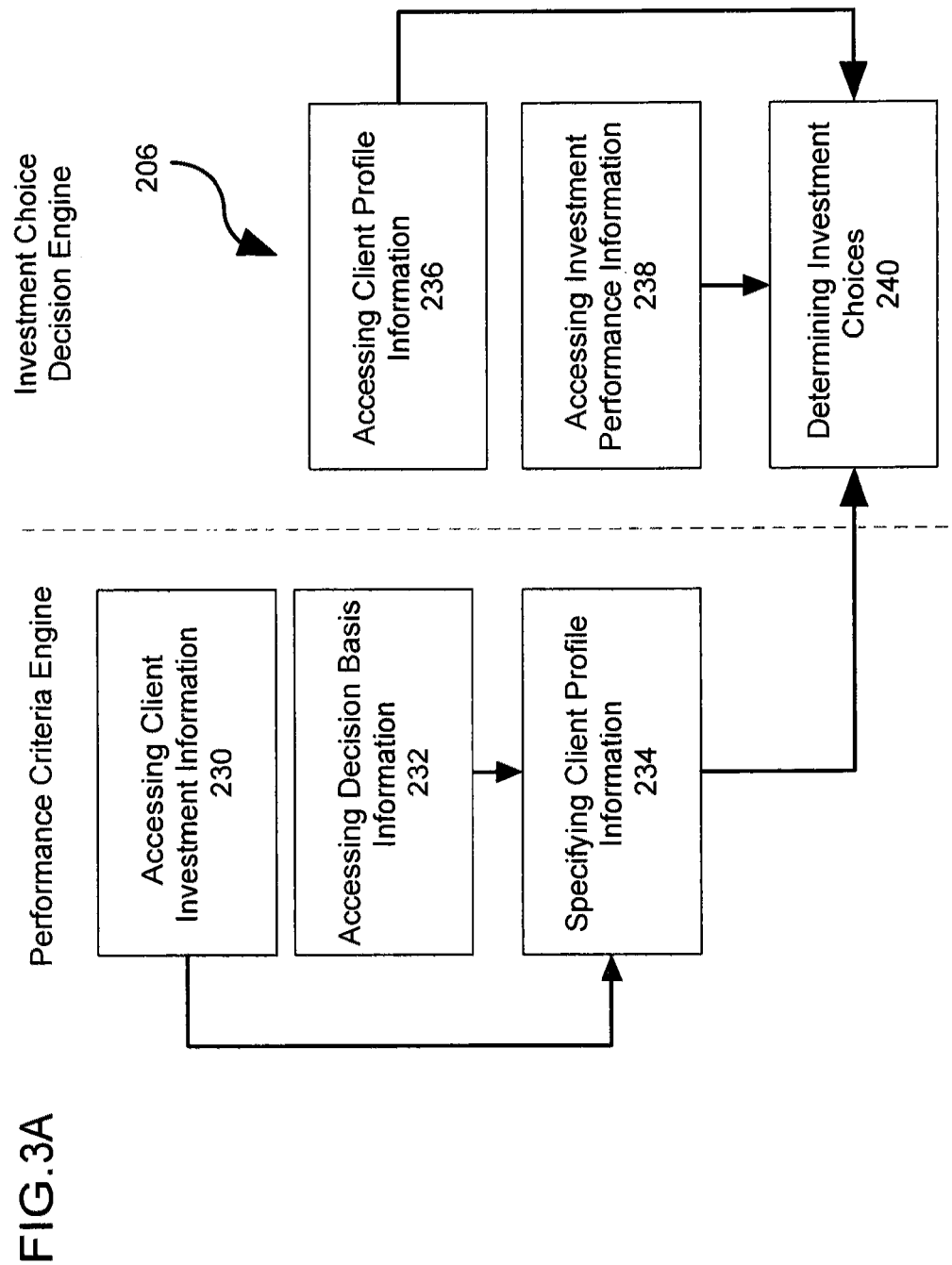
FIG. 3A shows an embodiment of the operation for determining the investment choices depicted in FIG. 2B.

FIG. 3A depicts an embodiment of the operation 206 for determining the investment choices. An operation 230 is performed by a performance criteria decision engine (i.e., a first decision engine) of the decision-assistance platform for accessing client background information and an operation 232 is performed by the performance criteria decision engine for accessing decision basis information. In one embodiment, client background information and decision basis information are accessed from one or more databases by the performance criteria decision engine.

In response to the client background information and the decision basis information being accessed, an operation 234 is performed via the performance criteria decision engine for specifying client profile information, which can include investment effect parameters. Examples of the corresponding investment effect parameters include, but are not limited to, parameters associated with risk of an investment, parameters associated with return on an investment, parameters associated with other structural and performance aspects of an investment, various investment allocation rules and parameters associated with correlating investment opportunities to client financial expectations. In at least one embodiment, the category of investment effect parameters includes investment allocation parameters. Examples of steps comprising determining performance criteria include, but are not limited to, selecting asset classes, selecting data sets for investment choices corresponding to selected asset classes, selecting performance criteria, defining performance criteria weightings, selecting performance factors, defining performance factor weightings, defining filter structures (e.g., one or more dynamic range filter structures), defining processing instructions.

An investment choice decision engine (i.e. a second decision engine) of the decision-assistance platform performs an operation 236 for accessing the client profile information. After determining the performance factor weightings, the investment choice decision engine performs an operation 238 for accessing investment performance information (e.g., risk, return, and other structural and performance information), followed by the investment choice decision engine performing an operation 240 for determining investment choices dependent upon the client's individual investment needs, desires and/or goals. Preferably, the respective decision engines facilitate determining the performance selection and weighting factors, determining investment effect parameters, and determining an objective scoring and ranking of available investment choices without human intervention during the respective computation operations.

It is disclosed herein that functionality (e.g., operations) facilitated by the decision engine interface of the decision-assistance platform are facilitated manually by a person. In such an embodiment, resulting information from the manually facilitated functionality is subsequently made available to the investment choice process for enabling functionality of the decision engine of the decision assistance platform.

Figure 3B:
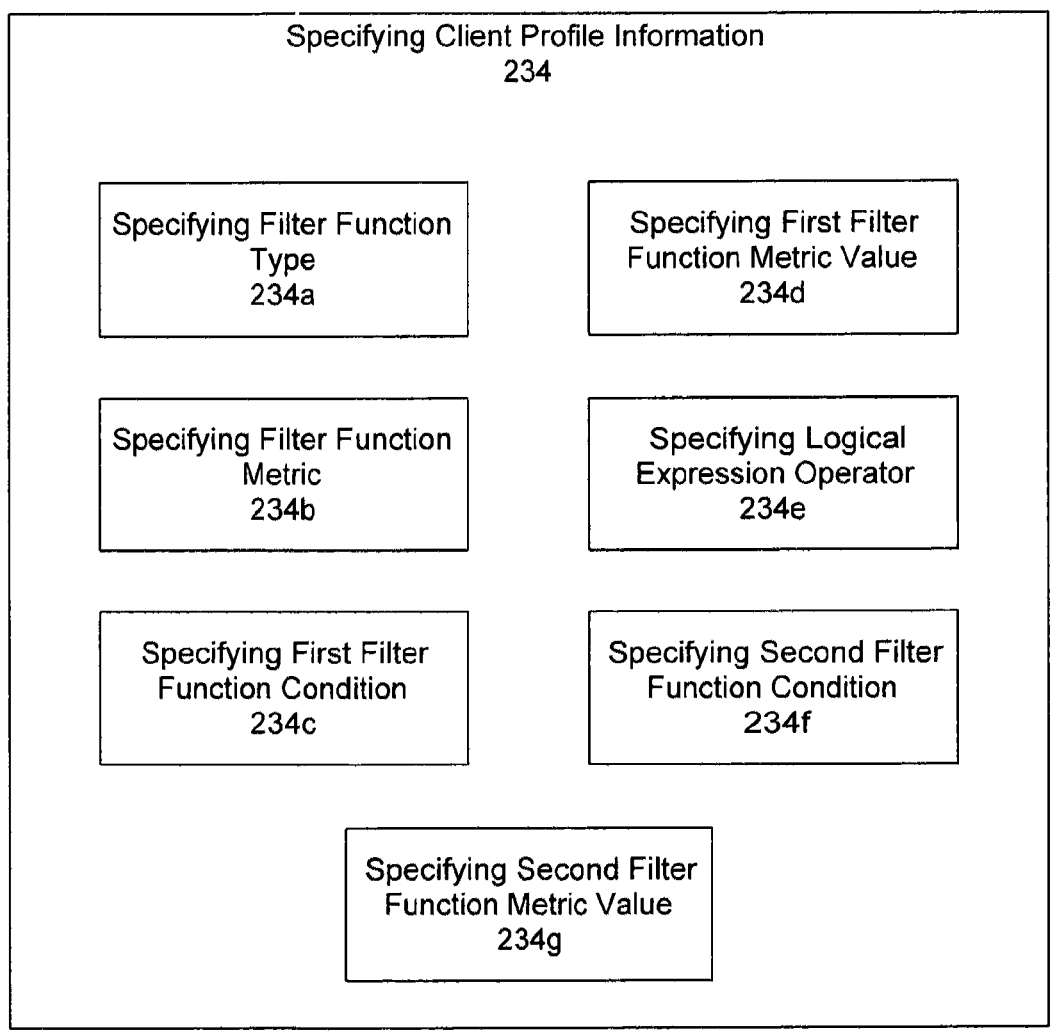
FIG. 3B shows an embodiment of setting up a filter structure in accordance with the present invention for application to investment choices to create filtered investment choices.

FIG. 3B depicts an embodiment of an approach for setting up a filter structure 280 (shown in FIG. 3C) for being applied to investment choices, thereby creating filtered investment choices. A filter structure refers to an information structure configured for providing information (e.g., data) filtering functionality. In one embodiment, providing such a filter structure can be performed as a component of the operation 234 for determining corresponding performance criteria (e.g., investment effect parameters). The underlying intent of a filter structure configured in accordance with the present invention is to identify filtered ones of a plurality of available investment choices that each possess ones or more characteristics (i.e., as defined by the filter) that beneficially or adversely distinguishes them from other ones of such available investment choices.

Filters are classically practiced in a way to remove items from a group of items. However, a filter structure configured in accordance with the present invention act as a set of rules. The set of rules can include a plurality of filter functions. Each one of the filter structure functions (i.e., a rules component) can include a parameter specifying a filter function type, a parameter specifying a filter function metric associated with the filter type, a parameter specifying a first filter function condition upon which the filter function metric is to use when information is to be filtered (e.g., an investment choice data set), and a parameter specifying a first filter function metric value corresponding to the filter function metric. Optionally, each one of the filter functions can include, a parameter specifying a second filter function metric value, a parameter specifying a second filter function condition upon which the second filter function metric value is applied, and a parameter specifying a logical expression operator upon which the second filter function metric value is associated with the first filter function metric value.

Metric as used in the context herein refers to a business metric. A business metric is a type of measurement used to gauge some quantifiable component of a business endeavour's performance. Examples of business metrics can include, but are not limited to, return on investment, investment risk (e.g., standard deviation), employee and/or investor churn rates, revenues, etc. Business metrics can comprise a wide variety of applications and technologies for gathering, storing, analyzing, and providing access to data to help make better decisions with respect to the business endeavour and/or its products or services (e.g., investment portfolio and management thereof).

Accordingly, in one embodiment of the present invention, setting up a filter structure 280 (FIG. 3C) via the operation 234 (FIG. 3B) for determining corresponding performance criteria can include an operation 234*a* being performed for specifying a filter function type 235*a*, an operation 234*b* being performed for specifying a filter function metric 235*b* associated with the filter type 235*a*, an operation 234*c* for specifying a first filter function condition 235*c* upon which the filter function metric 235*b* is applied, and an operation 234*d* being performed for specifying a first filter function metric value 235*d* corresponding to the filter function metric 235*b*. Optionally, a second filter function condition 235*f* and a second filter function metric value 235*g* can be associated with the first filter function metric value 235*d*. To this end, an operation 234*e* can be performed for specifying a logical expression operator 235*e* upon which the second filter function metric value 235*g* is associated with the first filter function metric value 235*d*, an operation 234*f* can be performed for specifying the second filter function condition 235*f* upon which the second filter function metric value 235*g* is applied, and an operation 234*g* can be performed for specifying the second filter function metric value 235*g*.

Examples of filter function types include, but are not limited to, U-Exclude, Exclude, U-Include, Include, Force, Tag, and Display. U-Exclude filter function type and Exclude filter function type are the most common filter function types for an analysis level filter function. They provide similar functionality in that they both remove investment choices from the analysis. The minor difference is the U-Exclude filter function type removes investment choices so that they will not influence the scoring and ranking of remaining mutual funds whereas the Exclude filter function type does not. In one example, the U-Exclude filter function type can be used to exclude managers from the analysis where the category is not equal (e.g., Long-Term Growth)". Exclude filter function type disqualify investment choice so they will not show in the resulting analysis information (e.g., analysis tables), thereby keeping them within the asset class so they can influence scoring and ranking of all investment choices but removing them as potential choices. U-Include filter function type and Include filter function type are used to put investment choices into (or back into) the analysis, thereby providing effectively opposite functionality of U-Exclude filter function type and Exclude filter function type, respectively. The Force filter function type is similar to the Include filter function type, but the Force filter function type cannot be overridden by any other filters. Once an investment choice is "forced" into an analysis, it cannot be removed or disqualified. Additionally, Forced investment choices are always presented in an analysis (e.g., designated as an alternate color for identification). The Force filter function type is both a presentation level filter function and analysis level filter function. The Tag filter function type is a presentation level filter function, in that any tagged investment choices, are present with an alternate color, if they happen to score or rank high enough for presentation in the analysis table. Display filter function type is a presentation level filter function that can color investment choices in an analysis table in any number of alternate colors.

The filter function metric specifies a metric such as, for example, a performance factor that is associated with a corresponding filter function metric value (e.g., the filter function metric value 235*d*). This component of a filter function defines and/or identifies the specified metric that will be measured against a specified metric value of the filter function. This list typically contains all the available data columns within a selected data set (e.g., data columns specifying information associated with investment choices within an asset class). Examples of filter function metrics include, but are not limited to, a name of a performance factor or criteria, a designation of a performance factor or criteria relating to risk of an investment choice, a performance factor or criteria relating to return provided by an investment choice, a required investment level, etc. Examples of performance factors that can be used as filter function metrics can be found in Table 1 herein.

A filter function condition defines the conditional component of a filter function, which determines how the filter function metric value of the filter function will be applied against a corresponding metric value of an investment choice. The filter function condition for a filter function can be an arithmetic expression operator (e.g., greater than, less than, equal to, not equal to) that is applied between the filter function metric value of the filter function and the corresponding metric value of an investment choice. The filter function condition can also be a condition that causes searching for investment choices having a metric value corresponding to the filter function metric value of the filter function (i.e., Contains filter function condition (C)), a condition that causes searching for investment choices not having a metric value corresponding to the filter function metric value of the filter function (i.e., Not Contains filter function condition (NC)), a condition that causes banding of investment choices around a metric value (i.e., performance) of a target benchmark defined by the filter function metric value and matched to the function metric or performance factor "Name" (i.e., Band Name dynamic filter function condition (BN)), a condition that defines a percentage to range around the performance factor value of the target benchmark defined by a Banded Name condition (i.e., Band Percentage (BP)), a condition for a low pass dynamic filter that would be applied as the Banded Name (i.e., Low Pass dynamic filter function (LN)), a condition for a high pass dynamic filter that would be applied as the Banded Name (i.e., High Pass dynamic filter function (HN)), a condition for a fixed value to apply around each investment choice performance factor value (i.e., Banded Absolute filter function condition (BA)).

Logic expression operators are used to determine whether a filter is to use a single or multiple filter function conditions (e.g., one or more pairings of filter function condition and filter function metric value). Examples of such logic expression operators include, but are not limited to a logic expression operator that requires at least two filter function conditions to be met (i.e., AND logic expression operator) and a logic expression operator that allows one of a plurality of filter function conditions to be met (i.e., OR logic expression operator). It is disclosed herein that other logic expression operators are possible. It is disclosed that a logical expression operator must be selected to enable a first filter function condition/filter function metric value pairing to be associated with a second filter function condition/filter function metric value pairing. It is also disclosed herein that, in the case of a dynamic range filter, logical expression operators do not play any role in the corresponding filter function, other then activating fields for use in specifying the second filter function condition/filter function metric value pairing.

One embodiment of the present invention involves using an active core/satellite portfolio design methodology to analyze select investment choices. Such an active core/satellite portfolio design methodology aids in fine-tuning overall portfolio risk exposure/volatilities. The intended investment effect from such fine-tuning is the optimization of the portfolio's risk/return profile through changing market conditions. In this manner, designing and implementing a portfolio in accordance with the present invention can provide for potentially higher high returns in up markets periods and potentially higher low returns (or, potentially reduced losses) in down market periods with respect to a benchmark investment choice (e.g., indices, blended indices, other investment choices, or performance benchmarks).

Implementation of active core/satellite asset allocation in accordance with the present invention does not necessarily exclude any of the benefits practiced by the general financial industry. Rather, it places significant focus on controlling certain plan performance factors. For example, in one embodiment, significant focus is placed on selecting managers with superior performance to a benchmark, ideally with similar average volatility but with greater average returns. Advantageously, selecting managers with superior performance to the benchmark supports the use of an active core so that some degree of alpha performance (i.e., performance (e.g., returns) in excess of that of a benchmark) may be generated in both the core and satellite asset class components of the portfolio, while still maintaining beta exposure/performance (i.e., performance (e.g., risk exposure) on par with that of the benchmark). By removing constraints on manager volatility, satellite manager selection can produce alpha in a number of ways. In up markets, superior managers with potentially higher volatilities can be selected that have demonstrated an ability to generate average returns greater than that of the benchmark. Similarly, satellite asset class managers can be identified that may reduce the overall volatility of a plan, and result in the production of alpha through the production of smaller losses than that of the relevant benchmark in down markets.

A core allocation refers to an allocation within an asset class that is created to produce the beta exposure/performance of that particular asset class component of an overall portfolio. Thus, a core asset class is typically expected to follow market performance thereby allowing it to produce relatively the same performance results as the benchmark used to measure the asset class against. Benchmarks are typically not something an investor can hold, so there are passive managers and passive investment vehicles created with the specific purpose of mirroring the performance of the benchmarks. Core asset classes are also generally referred to as a "passive core" asset class meaning that they are passive because their intended objective is only to duplicate benchmark performance. An active core asset class is designed with the expectation of producing an alpha performance component for a particular asset class (and therefore an overall portfolio) in a manner not possible through use of a passive core strategy. Thus, an active core asset class is typically expected to provide excess return performance above that of corresponding markets thereby allowing it to produce better composite performance results than the benchmark used to measure the asset class. (e.g., higher returns for essentially similar risk exposure) Similar risk exposure (defined by the investor) implies that performance factor values of investment choices are around (near, close to) the performance factor values of the benchmark used to measure the asset class. Active core asset class managers follow mandates that may or may not define some guidelines to follow or loosely follow benchmarks by actively managing their portfolios. In some preferred embodiments of the present invention, the intention is to find active managers based on performance factors relating to volatility, the objective is to find investment choices with better overall performance from these active managers. A satellite asset class is designed with the intent of producing alpha for the overall portfolio. Thus, the mandates of active managers (i.e., managers of satellite asset classes) may cause performance to very widely from benchmarks assigned to the asset class. Conservative satellite asset classes are designed to expose the portfolio to less volatility than the benchmark assigned to this asset class thereby preserving assets in highly volatile down market periods. Accordingly, conservative satellite asset classes tend to naturally evolve in satellite asset classes (FIG. 3F) in strong down markets, as the better performing managers tend to be the ones that lose less value.

It is disclosed herein that satellite investment choices in the context of the present invention can be defined to be investment choices that are unconstrained by the filter structure used in determining investment choices that qualify as core investment choices. Such satellite investment choices are constrained to be within the same asset class as such investment choices that are determined by the filter structure to be qualified core investment choices. Accordingly, it is disclosed herein that a value for a particular metric for each one of the qualified core investment choices is between upper and lower values filter function metric values determined dependent upon a value of the particular metric for a benchmark investment choice defined by the filter structure and that a value for the particular metric for each one of the disqualified core investment choices is one of above the upper filter function metric value and below the lower filter function metric value or is otherwise disqualified by metrics within the filter structure. In view of the foregoing discussion, a skilled person will understand that core investment choices that are each determined using a first filter structure and satellite investment choices are each determined using a second filter structure different than the first filter structure. At a minimum, the distinction between the first and second filter structures is that the second filter structure does not include a banding constraint (e.g., Banded Name condition (i.e., Band Percentage (BP)), as discussed above).

From the disclosures made herein, it will be appreciated that a primary objective of implementation of active core/satellite asset allocation in accordance with the present invention is reducing and/or fine tuning portfolio risk exposure. In contrast to the common industry practice of using the tracking error statistics of selected managers to calculate the allocation size of passive core and satellite components of a portfolio (i.e., calculating the appropriate allocation to fit selected managers), embodiments of the present invention use any statistics (e.g., not just tracking error) for the purpose of finding managers that best fit active core and satellite allocations defined for the overall portfolio plan. In this manner, embodiments of the present invention provide for finding the preferred managers to fit a defined asset allocation, which is the reverse of the industry approach that adapts allocation percentage to fit a preselected manager. This approach of finding the preferred managers to fit a defined asset allocation provides for performing multiple manager searches to find managers that provide different investment effects (e.g., active management bets) for optionally splitting up a satellite allocation into multiple satellite allocations that each contain a selected manager to provide a different investment effect. Additionally, multiple manager searches can be performed for the active core with the objective of looking for one or more managers that have similar volatility (relatively small active management bets) and greater returns against a benchmark. Accordingly, it is disclosed herein that implementation of active core/satellite asset allocation in accordance with the present invention can be performed in a manner that that allows for multiple core managers in the same active core.

The filter structure 280 is an embodiment of a dynamic range filter structure configured in accordance with the present invention. The filter structure 280 is used for defining active core investment choices and satellite investment choices. The active core investment choices are selected dependent upon a benchmark investment choice of the filter structure. In particular, the filter structure 280 specifies the S&P 500 (composite) as the benchmark investment choice. Thus, one example of a benchmark investment choice is an asset class index.

The filter structure 280 includes a plurality of filter functions 281. The filter structure 280 is configured to exclude investment choices in a manner jointly dictated by the filter functions 281. The filter function type 235*a* defines a type of each one of the filter functions 281, which in this embodiment, jointly act to exclude investment choices that meet the requirements of the specified filter function. The filter function metric 235*b* defines a common performance factor (5-year average standard deviation) for investment choices and a target benchmark investment choice. The first filter function condition 235*c* defines a banded target, thereby defining the filter structure as a dynamic range filter structure. The first filter function metric value 235*d* defines the name of the target benchmark investment choice to band around (i.e., thereby identifying investment choices within the active core). In this case, the target benchmark investment choice is an index (i.e., the S&P 500), but can be an investment choice that is not an index. The logical expression operator 235*e* has no effect in view of the filter structure being a dynamic range filter structure. The second filter function condition 235*f* defines the range parameter type, which is BP (i.e., Band using a fixed Percentage (e.g., 25%)). The second filter function metric value 235*g* defines the range parameter value that is applied to the targeted filter performance factor value (i.e., function metric value) of the benchmark investment choice.

For investment choices within a data set of the specified asset class, the filter structure 280 can be applied for defining high and low filter function metric value (e.g., performance factor value) limits resulting from the filter. For the data depicted in FIG. 3D, the high limit targeted performance factor value, where the metric value of the ASD 5-year for the S&P 500 (Investment Choice 378) is 16.65, would be 20.8125 (i.e., 16.65×(1+(25 range parameter value/100))) and low limit targeted performance factor value would be 12.4875 (i.e., 16.65×(1−(25 range parameter value/100))). Accordingly, during a current instantiation of the data set of the specified asset class (FIG. 3D), these high and low targeted performance factor values define the performance factor value range (i.e., between 12.4875 and 20.8125) of active core investment choices (i.e., range of performance factor values for investment choices that can be within the active core). Put differently, filtered investment choices defined by the filter structure 280 (i.e., a dynamic range filter structure) each have a filter function metric value (e.g., performance factor value) that is between upper and lower filter function metric values (e.g., filter-defined performance factor values) of the dynamic range filter structure. Thus, from the disclosures made herein, a skilled person will understand that the low and high limit targeted performance factor values define a performance factor value range (e.g., filter functional value range) resulting from the filter structure.

Figure 3E:
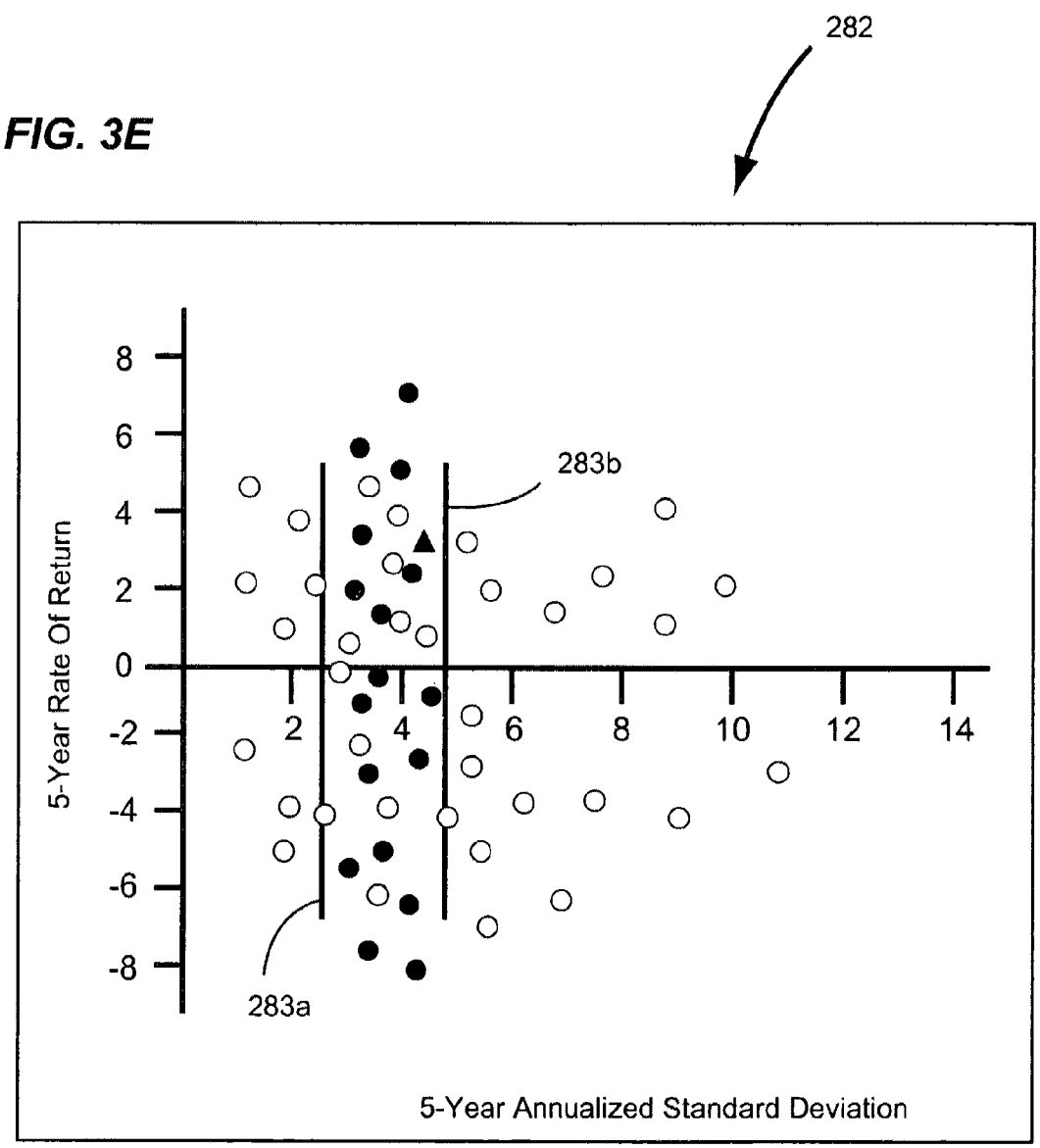
FIG. 3E depicts filtered investment choices resulting from a dynamic range filter structure configured in accordance with an embodiment of the present invention being applied to an investment choice data set

FIG. 3E shows filtered investment choices resulting from a dynamic range filter structure configured in accordance with an embodiment of the present invention (e.g., the filter structure 280 of FIG. 3C) being applied to an investment choice data set. The filtered investment choices are presented in an embodiment of an active core analysis graph 282. As can be seen, the active core analysis graph 282 can show relative performance of qualified active core investment choices (designated as dots), disqualified investment choices (designated as open circles), and the benchmark investment choice (designated as a triangle). The qualified active core investment choices are defined between a first line designating a lower filter function metric value (i.e., lower limit line 283*a*) determined by the dynamic range filter and the upper filter function metric value (i.e., upper limit line 283*b*) determined by the dynamic range filter. A comparative assessment of the qualified active core investment choices can be performed by scoring and ranking (i.e., quantifying performance) such qualified active core investment choices. In this manner, a comparative performance assessment is an example of a comparative assessment of investment choices. The disqualified investment choices are those investment choices that have been found to not meet one or more requirements of being available investment choices by one or more filter functions of the a dynamic range filter structure. For example, with respect to volatility, a component of the "investment effect" desired from an active core (e.g., an active core manager) is to expose a corresponding investment portfolio to an investment potential of its asset class using the full measure of the risk budget inherent in that asset class combined with a higher average return than that of the benchmark against which the performance of that class is being measured. Therefore, in order to qualify for consideration as an active core manager within any asset class, managers must meet the following two requirements (i.e., core filters"): 1.) They must have an investment style and investment holdings reasonably consistent with (though not necessarily identical to) that of the general benchmark for the asset class (i.e., specialty or narrowly niched/sectored managers would be eliminated (i.e., disqualified) from consideration and 2.) the historical volatility of such managers must be reasonably similar to that of the benchmark for that asset class (e.g., 25% more or less than the volatility of the benchmark). In other words, the search for active core managers within any asset class will typically be a "constrained search" whereby the universe of possible candidates will be narrowed to managers that vary above or below the volatility of the asset class' benchmark by a certain specified upon percentage (e.g. plus or minus 25%), fixed amount, etc. After a universe of qualified candidates has been selected (i.e., qualified active core investment choices), they will be scored and ranked in a manner in a manner resulting in identification of one or more managers that will provide the portfolio with similar volatility exposure to the benchmark, but with potentially higher average returns, than that of the benchmark.

In view of the disclosures made herein, a skilled person will understand that the lower and upper filter function metric values determined by the dynamic range filter can vary with time because the filter function metric value of the benchmark investment choice varies with time (i.e., are dynamic), will understand that the formula used for deriving the lower and upper filter function metric values, which is determined from the dynamic range filter, does not vary with time, and will understand that investment choices that are outside of the range defined by the lower and upper filter function metric values are disqualified from being core investment choices but can be satellite investment choices. Accordingly, top scoring investment choices for the active core and/or satellite(s) at a first point in time will typically be different than top scoring investment choices for the active core and/or satellite(s) at a second point in time. Still further, in view of the disclosures made herein, a skilled person will understand that the filter structure 280 provides an approach for implementing active core/satellite portfolio design methodology.

Figure 3F:
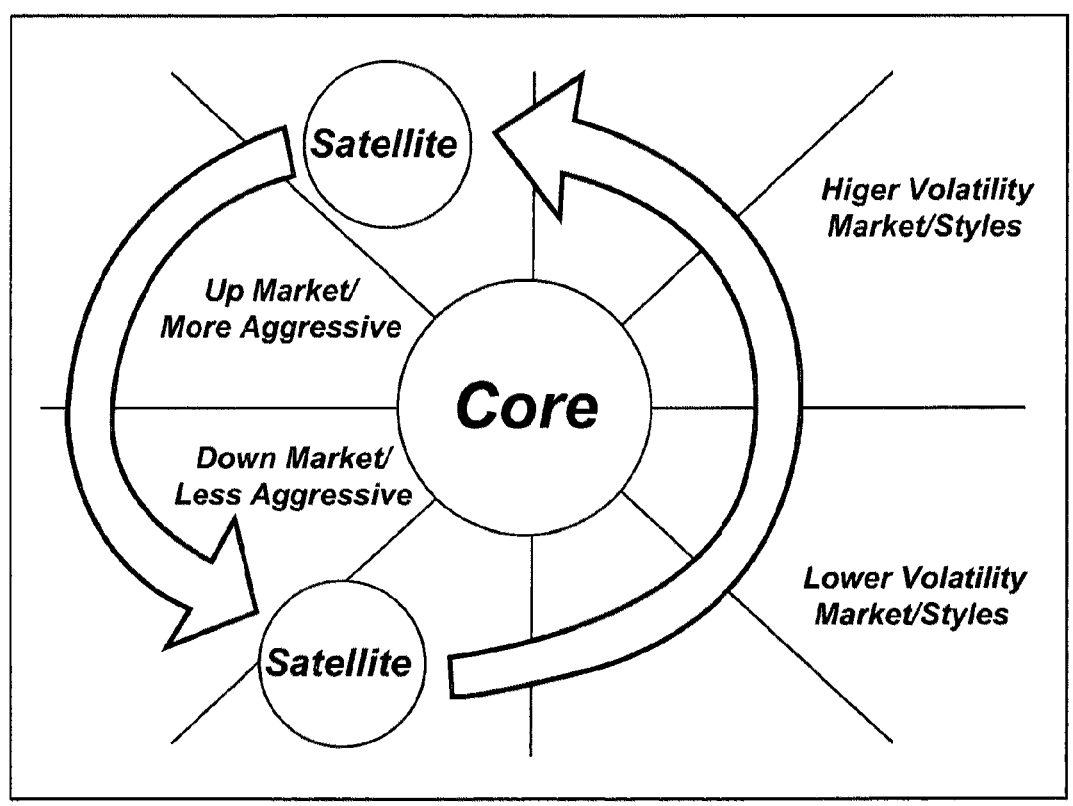
FIG. 3F is a first illustrative depiction of relative performance and movement (performance period to performance period) of satellite investment choices with respect to core investment choices.
Figure 3G:
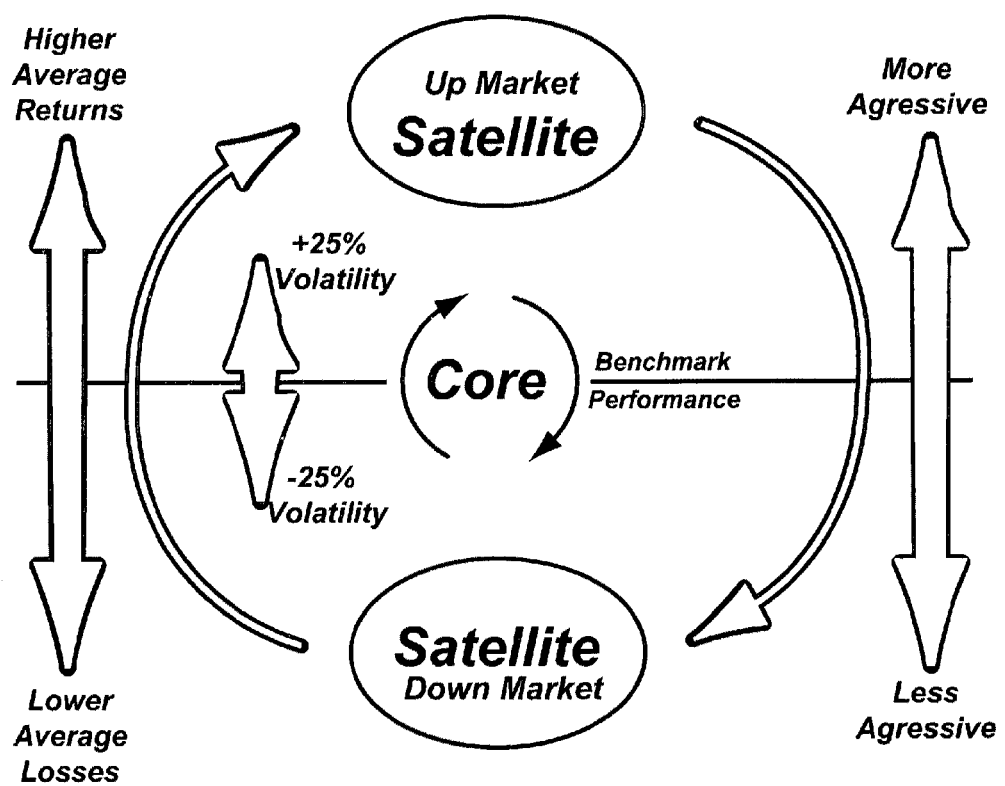
FIG. 3G is a second illustrative depiction of relative performance and movement (performance period to performance period) of satellite investment choices with respect to the subtle movement (performance period to performance period) of core investment choices.

In contrast, satellite managers are selected using broader asset class definitions, including the potential inclusion of specialty or narrowly sectored managers that would have been excluded in the core manager selection process, as well as managers with volatilities outside of the desired (and agreed upon) percentage range (e.g., plus or minus 25% of the benchmark for the asset class). The aim in selecting a satellite manager would be to position the portfolio (to a greater or lesser extent, dependant upon the relative amount allocated to satellite versus the core mangers) to be better able to adapt to and benefit from changing market conditions by increasing exposure to sectors that have come into favor while reducing exposures to sectors that have dropped from favor in the markets. As can be seen in FIGS. 3F and 3G, satellite investment choices can be either more aggressive than core investment choices (i.e., have potentially greater volatility and greater potential returns than the core investment choices, especially in up market periods) or less aggressive (i.e., with less volatility and possibly less loss potential than the core investment choices, especially in down market periods). Less aggressive satellite investment choices can be desirable in down market periods during which downside volatility is generally increasing. During down market periods, more conservative satellite investment choices (i.e., satellite investment choices that are less aggressive and less volatile than core investment choices) would tend to lose less money than core investment choices. And, during such periods, having satellite investment choices of that type within the asset class would tend to improve the overall performance of the portfolio by helping to reduce both the downside volatility and potential investment losses of the asset class. All of this is aimed at producing the desired result (i.e., investment effect) of "higher lows" in down market periods as well as "higher highs" in up market periods. Similarly, core investment choices can also be more or less aggressive than corresponding benchmark performance during a particular market and/or portfolio assessment period.

FIG. 4 depicts an embodiment of the operation 218 for performing the comparative performance assessment of the investment portfolio. An operation 260 is performed for determining portfolio investments (i.e., the investment choices that presently comprise the client's portfolio). In response to determining the portfolio investments, an operation 262 is performed for determining a corresponding investment performance score for each of the portfolio's individual investments and an operation 264 is performed for determining a corresponding composite investment performance score. The composite investment performance score is a composite score that allows for a comparative analysis (i.e. a scoring and ranking) of the overall performance of all of the individual portfolio investments.

After the portfolio investments are determined, an operation 266 is performed for determining comparison investment indices corresponding to each one of the portfolio investments. The comparison investment indices are those indices that suitably correspond to each of the portfolio investments (e.g., within a corresponding asset class, exhibiting corresponding performance factors, etc). In response to determining the comparison investment indices, an operation 268 is performed for determining a corresponding investment index performance score for each of the comparison investment indices and an operation 270 is performed for determining a corresponding composite investment index performance score. The composite investment index performance score is a composite score that represents an overall performance of all of the individual investment indices represented within the portfolio as a whole. These individual and composite investment index performance scores are computed in the same manner (i.e., using the same performance factors and the same performance factor weightings) as is used in operations 262 and 264 described above. After determining the various performance scores, the operation 220 (FIG. 2C) is performed for providing such information for associated operations (e.g., for printing and/or displaying such periodic performance information).

It is contemplated that determining the composite investment index performance score may include combining the respective investment index indices dependent upon information determined from actual allocations of funds within the corresponding investment portfolio and/or upon at least one of criteria relating to risk and criteria relating to return. Similarly, it is contemplated that determining the composite investment performance score may include combining the respective portfolio investments dependent upon information determined from actual allocations of funds within the corresponding investment portfolio and/or upon at least one of criteria relating to risk and criteria relating to return. Furthermore, it is disclosed herein that a decision engine system of the decision assistance platform and/or a document assembly engine of the decision assistance platform may perform the functionality of the operation steps of 218 for performing the comparative performance assessment of the investment portfolio.

Accordingly, scoring and ranking of all available investment choices within each asset class within the client's portfolio is performed. The scoring and ranking is performed typically (thought not necessarily) using the same performance parameters and parameter weightings used in the original scoring and ranking analysis used by the client to select the clients investment choices. The various related investment indices are scored and ranked in exactly the same manner as the investment choices within the asset class for which a particular index is relevant. The scoring process produces a composite numerical score for each of the client's investment choices, all other available (yet unchosen) investment choices, and the relevant indices.

These numeric scores, when used to sort the results of the scoring (e.g., from the highest composite score to the lowest composite score), effectively and quantitatively compare all investment choices with each asset class (both chosen and unchosen) as well as the relevant indices. The highest scoring and, therefore, the highest ranking of the choices are those whose blended composite score (i.e., the score resulting from the blending of all of the individually weighted performance factors used in the scoring process) indicate those choices that the historic performance which most closely matches the investment performance desired by the client for a particular asset class being evaluated (i.e., the performance desired of that asset class, which was the reason for the inclusion of that asset class in the portfolio).

It is disclosed herein that the investment indices may correspond to asset classes corresponding to the individual portfolio investments as opposed to broader or more general asset class indices. In such case, it is contemplated that the comparative performance assessment would be performed between allocated investments (i.e., those selected investment choices that are funded) and a plurality of non-allocated investments represented by the asset class (i.e., all or a portion of the investment choices that were not selected for being funded).

Figure 5:
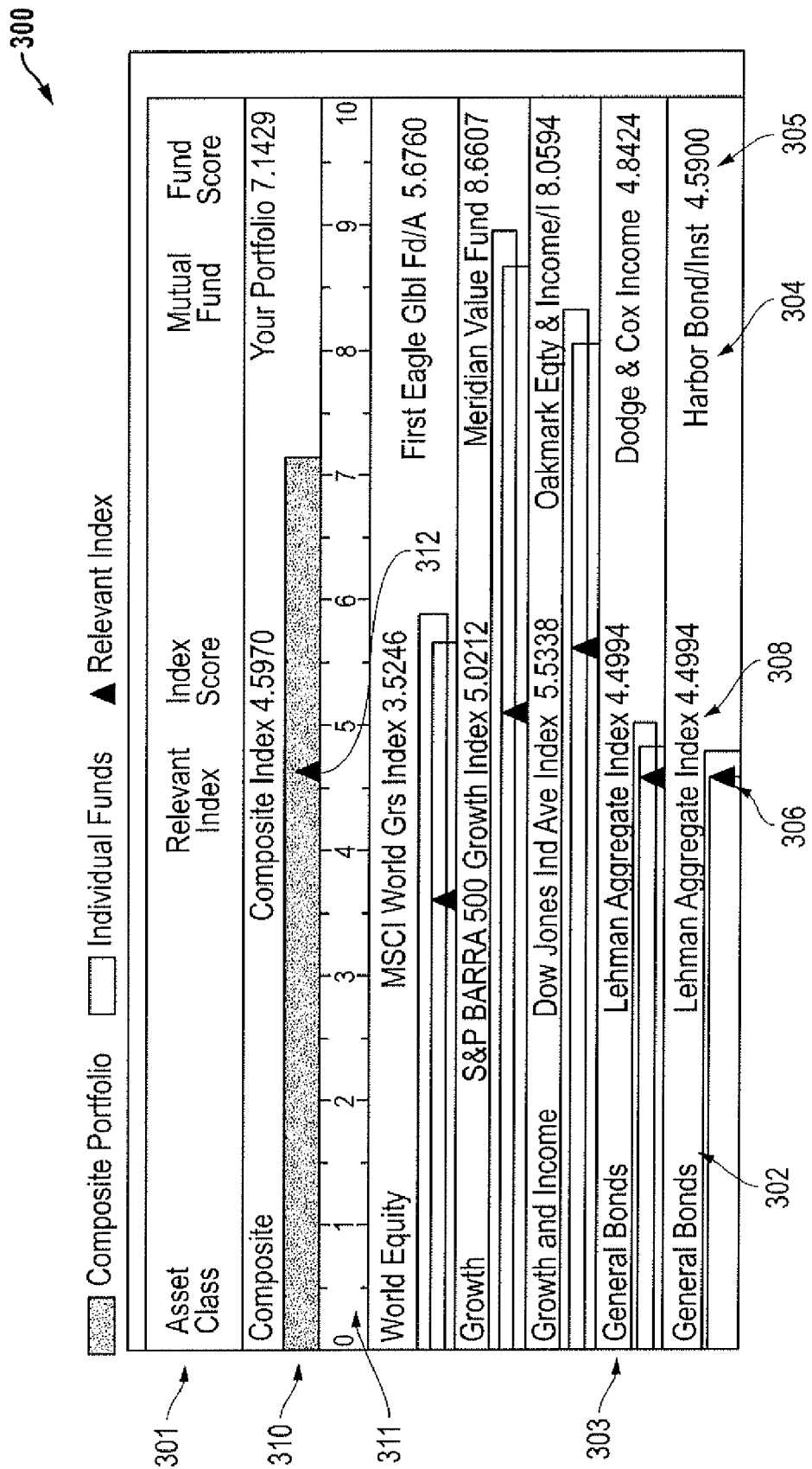
FIG. 5 is a chart depicting a graphical representation of composite performance scores and the composite portfolio performance scores in accordance with an embodiment of the inventive disclosures made herein.

FIG. 5 is a chart 300 depicting a graphical representation of performance scores that are depicted in view of corresponding asset classes 301. In one example, the chart 300 is comprised by a periodic performance report. The composite performance score 302 for each one of the asset classes 303 within the portfolio is depicted by a first configuration of graphical indicia (e.g., a corresponding horizontal bar of a first color). Depicted in association with individual managers and/or funds 304 is a composite score 305. The performance score 306 of each one of the investment indices 308 is depicted by a second configuration of graphical indicia (e.g., a discrete symbol of a first color) superimposed over the first configuration of graphical indicia. The composite investment performance score 310 is depicted by a third configuration of graphical indicia ((e.g., a corresponding vertical bar of a second color). The composite index score 312 is depicted by a fourth configuration of graphical indicia (e.g., a triangle) superimposed over the third configuration of graphical indicia. In this manner, the selected investment choices of the financial services client are graphically compared to appropriate benchmarks.

The chart 300 of FIG. 5 is configured to provide a summary of portfolio performance, using bar graphs to represent scores resulting from an assessment of the individual funds comprising the portfolio as well as the portfolio as a whole. The chart 300 provides a means for measuring overall portfolio performance, by comparing the "Composite Portfolio" score (i.e., the bar adjacent to the term "Composite") with the "Composite Index" score (i.e., the triangle superimposed on the bar adjacent to the term Composite). As depicted, the composite portfolio bar extends beyond the location of the composite index triangle. The positive differential indicated that the Composite Portfolio is outperforming the Composite Index in meeting stated performance goals. The chart 300 similarly depicts the performance of individual portfolio investments in relation to individual composite index components.

The graphical representation of the composite index score 310 is proportional to a blended score (i.e., discussed in the following paragraph in greater detail) of the portfolio and is positioned along a performance scale 311 such that its score can be compared to the composite index score 312 of the investment portfolio as a whole. The performance scale 311 serves as a means for measuring performance (e.g., scores) based on relative position of graphical representations depicting such scores. The graphical representation of each asset class performance score 302 is proportional to the composite score of individual fund (or manager) and is positioned with regard to the performance scale 311 such that its each performance score 302 can be compared to its fund's relevant index score 306. The graphical representation of a fund's relevant composite score index score 306 represents the performance of the respective fund.

The composite performance scores 302 for each individual fund and related asset class 303 provide a summary of the performance assessment performed on each of the portfolios asset classes. Additionally, blending of the performance scores of the individual funds held is used in determining the composite investment performance score 310. The scores of relevant indices 308 are similarly blended and used in determining the composite index score 312. In one embodiment, such blending is accomplished by using current market value of individual manager's holdings and the proportional percentage of those holdings with respect to the total value of the portfolio. For example, in an instance where the value of the manager's holdings were $5,000,000 and the total portfolio value were $100,000,000, 5% of the composite portfolio score 302 would be attributed to the composite investment score of that manager. Furthermore, the same proportion of 5% would apply to the manager's relevant index score and the blending determination of the composite index score.

Performance of a fund and its manager is typically considered within the context of a specific performance factor. For example, 5-year average return could be sorted to find out which manager had the highest return over a five-year period. However, when multiple performance factors (i.e., grouped as performance criteria used for decision making purposes) are used simultaneously to evaluate a manager's performance, the combining of each factor's performance is done in a manner that produces a composite score that can be used to evaluate the manager's/fund's overall performance. Once multiple performance factors (which are functionally used as decision criteria) are selected, individual weightings can be assigned to each of the performance factors so that the overall manager performance can be defined in relation to the specific performance and decision requirements (e.g., needs, goals, risk tolerances, etc) of the investor (i.e., the financial services client).

Figure 6A:
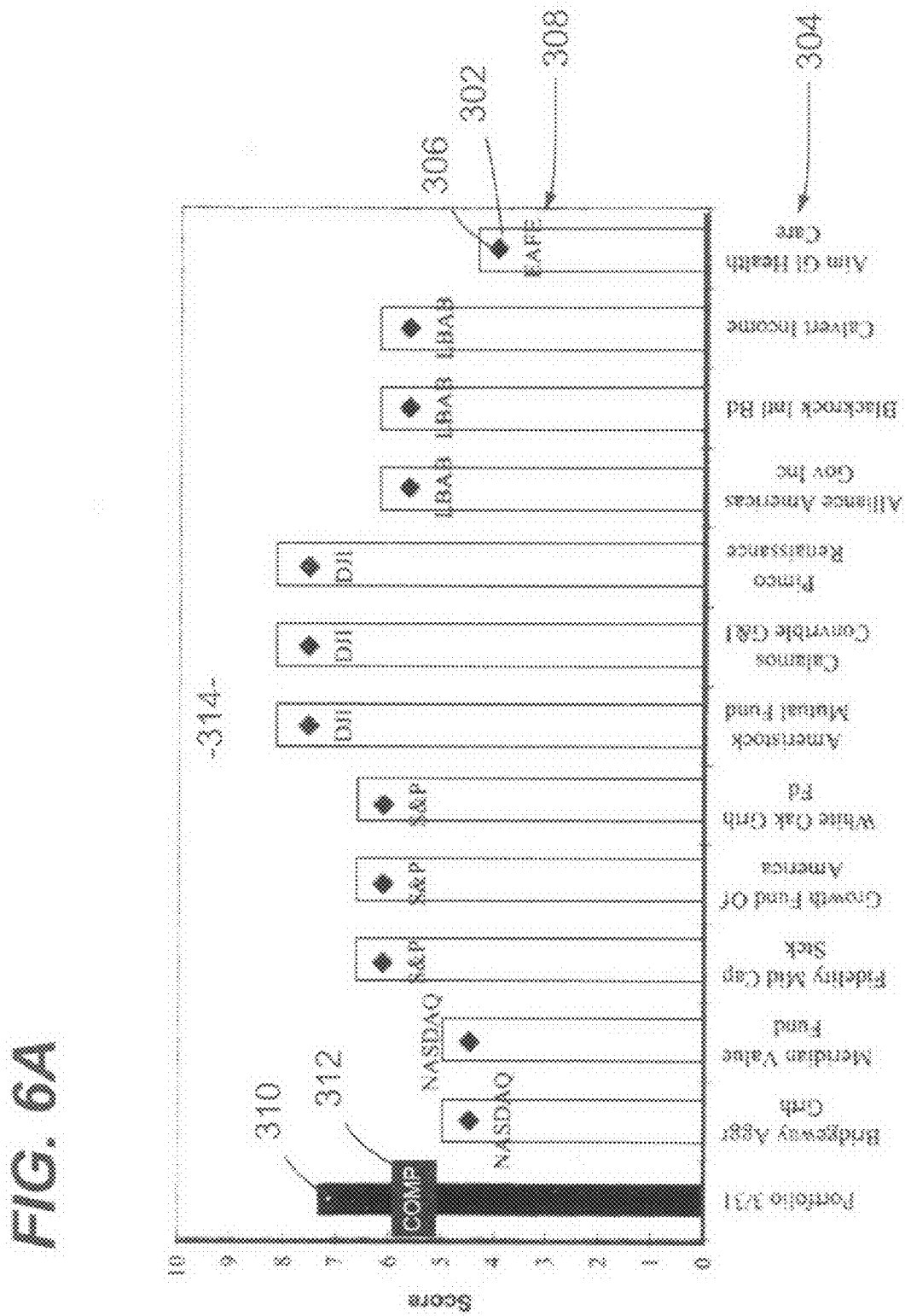

The chart 314 of FIG. 6A and the table 316 of FIG. 6B jointly depict an alternate embodiment for presenting the information depicted in the chart 300 of FIG. 5. While essentially the same information is presented in FIG. 5 as jointly depicted in FIGS. 6A and 6B, presentation in accordance with the chart of FIG. 5 is advantageous in that it allows a greater volume of information to be presented in a given amount of space (i.e., with respect to the presentation approach of FIGS. 6A and 6B).

It is disclosed herein that the charts depicted in FIGS. 5, 6A and 6B are examples of information configured for enabling objective and comparative assessment of investment choices to be made by an investor/financial services client. It is also disclosed herein that operations and/or approaches for generating all or a portion of the information comprised by the charts depicted in FIGS. 5, 6A and 6B are examples of assessing such information and/or enabling comparative assessment of such information.

FIG. 7A depicts a table 325 having a plurality of multi-segment bars 327 (e.g., bars with different color segments) that each graphically represents the components of a corresponding composite score. The lengths of each multi-segment bar 327 is proportional to its corresponding composite score 329 and, for comparison purposes, relative to all of the composite scores shown. The various segments 330 of each bar 327 represent the relative contribution to the total score of the performance of the corresponding weighted performance criteria. The length of each segment 330 represents a performance factor value's weighted performance, as compared against a group of its peers within the same asset class. Longer segments proportionally represent a larger impact on the composite score. The order of the segments of each bar match the display order of the performance factor labels 331 (e.g., 5-year return) in the header section of the table 325. However, in certain instances, a particular segment of a particular bar will not be depicted, representing that a manager is either missing data for the corresponding performance factor value or that a combination of minimal weighting and/or poor performance has cause that performance factor value to have little to no impact on the corresponding composite score.

Performance of a fund and its manager is typically considered within the context of a specific performance factor. For example, 5-year average return could be sorted to find out which manager had the highest return over a five-year period. However, when multiple performance factors (i.e., performance criteria used for decision making purposes) are used simultaneously to evaluate a manager's performance, the combining of each factor's performance is done in a manner that produces a composite score that can be used to evaluate the manager's/fund's overall performance. Once multiple performance criteria (which are functionally used as decision criteria) are selected, individual weightings can be assigned to each of the performance criteria so that the overall manager performance can be defined to the specific performance and decision requirements (e.g., needs, goals, risk tolerances, etc) of the investor (i.e., the financial services client). Having a visual representation of how weighted performance criteria impact the composite scores is useful for quickly identifying which decision criteria are having the most impact on the composite scores.

Relative performance of performance factor values (i.e., values utilized for making investment decisions) in accordance with the inventive disclosures made herein may be assessed relative to one or more points of reference. Relative performance of a performance factor values against all peers is a first point of reference. For example, comparing the length of the 5-Year Average Return segments in the Table 325 of FIG. 7A indicates roughly a 35% difference in length favoring the top rated manager, which is translated to same difference in performance as it relates to its peer group. Performance as it relates to the peer group is calculated (i.e., determined) using a scale of 5-Year Average Return values. All of the performance factor's peers define this scale and each performance score is applied to that scale to find it's relative rank within the group. Because the graphical representation of performance takes each performance factor's scale into consideration, it is useful for comparing performance of performance factor value scores quickly. Thus, large differences in performance between managers can be identified easily.

Relative performance of the performance factor values as it relates to the composite performance score is a second point of reference. Performance factor weightings are not mentioned when evaluating the relative performance of performance factor values relative to all peers. This is because the weighting assigned to each performance factor is applied equally to the group of peers. However, the weightings assigned to each performance factor directly influence determination of the composite score. For example, comparing the length of all the segments for the top manager shows that the majority of the weighting has been placed on the 5-Year Return and 5-Year Standard Deviation. For this example, 80% of the weighting is placed on the combination of those two performance factors, which means that on a composite scoring scale of 0 to 10, these two performance factors can add as much as 8 points to the composite score. Unlike the 5-Year performance factor, the combined weightings of the 3-Year Return and 3-Year Standard Deviation are only weighted at 17.5%, which can add as much as 1.75 points to the composite score. The weighting assigned to each performance factor acts as a multiplier that defines the maximum impact that any performance factor value can have on the composite score and also the maximum length of the corresponding segment of the bar in 327. The effect of the weighting can be seen easily by comparing the sizes of the 5-Year performance factor to the 3-Year performance factor.

FIG. 7B depicts a table 326 comprised by tabular data representing performance information for performance-qualified investment choices for a particular asset class. The table 326 depicted in FIG. 7B provides similar performance information as the table 325 depicted in FIG. 7A. However, the bulk of the performance information depicted in FIG. 7A is depicted graphically via the multi-segment bars 327 while the bulk of the performance information depicted in FIG. 7B is depicted in a tabular (i.e., numeric) format. Specifically, composite scores 329 and performance criteria values for performance criteria designated by performance criteria labels 331 are presented in a tabular format. Bolded numbers in each column, represent the best performance factor values presented in the table.

Table 325 depicted in FIG. 7A and the table 326 depicted in FIG. 7B both depict 'Other Rankings of Interest' 328. Examples of such other ranking of interest include, but are not limited to, allocated investments within a current investment portfolio and the asset class index that most closely matches the performance of the particular asset class. In one embodiment, the allocated investments within a current investment portfolio are designated via a respective visual indicia (e.g., a background of a first color) and the asset class index that most closely matches the performance of the particular asset class is designated via a second visual indicia (e.g., a background of a second color).

Figure 7C:
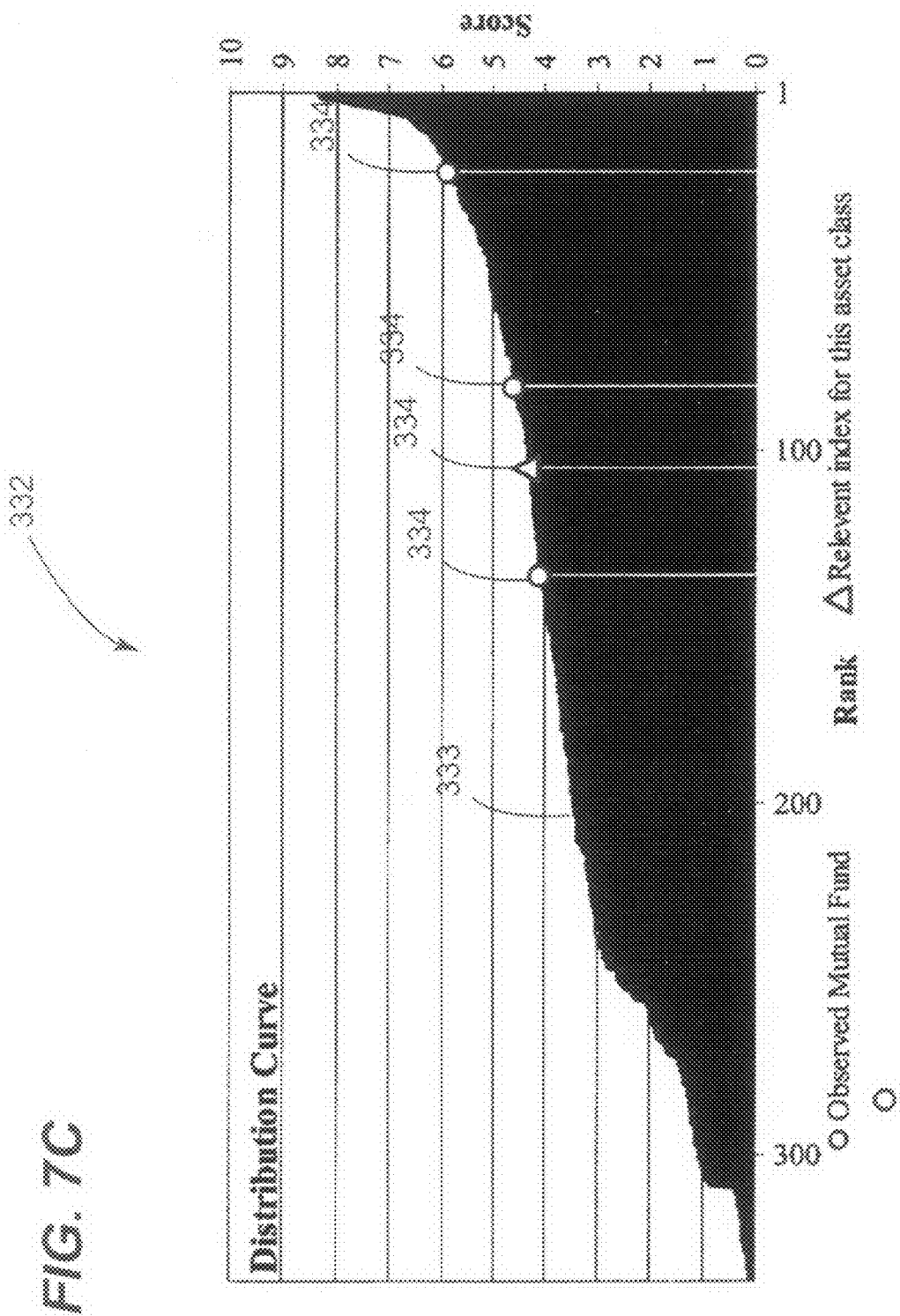
FIG. 7C depicts a composite performance score distribution graph for all available investment choices, wherein highlighted investment choices depicted in the table of FIG. 7B are noted with circle and triangle symbols.

FIG. 7C depicts a composite performance score distribution graph 332 for all available performance-qualified investment choices, and the investment choices depicted in the table 326 of FIG. 7B. A curve 333 is generated through plotting of the composite performance scores 329 for each of the performance-quantified investment choices, against the numerical rank of those performance-qualified investment choices and the other rankings of interest 328. Visual indicators 334 depict performance scores for the other rankings of interest 328, and any other highlighted performance-qualified investment choices. For example, a circle designates an allocated investment within the current investment portfolio and a triangle designates the asset class index that most closely matches the performance of the particular asset class.

Figure 8A:
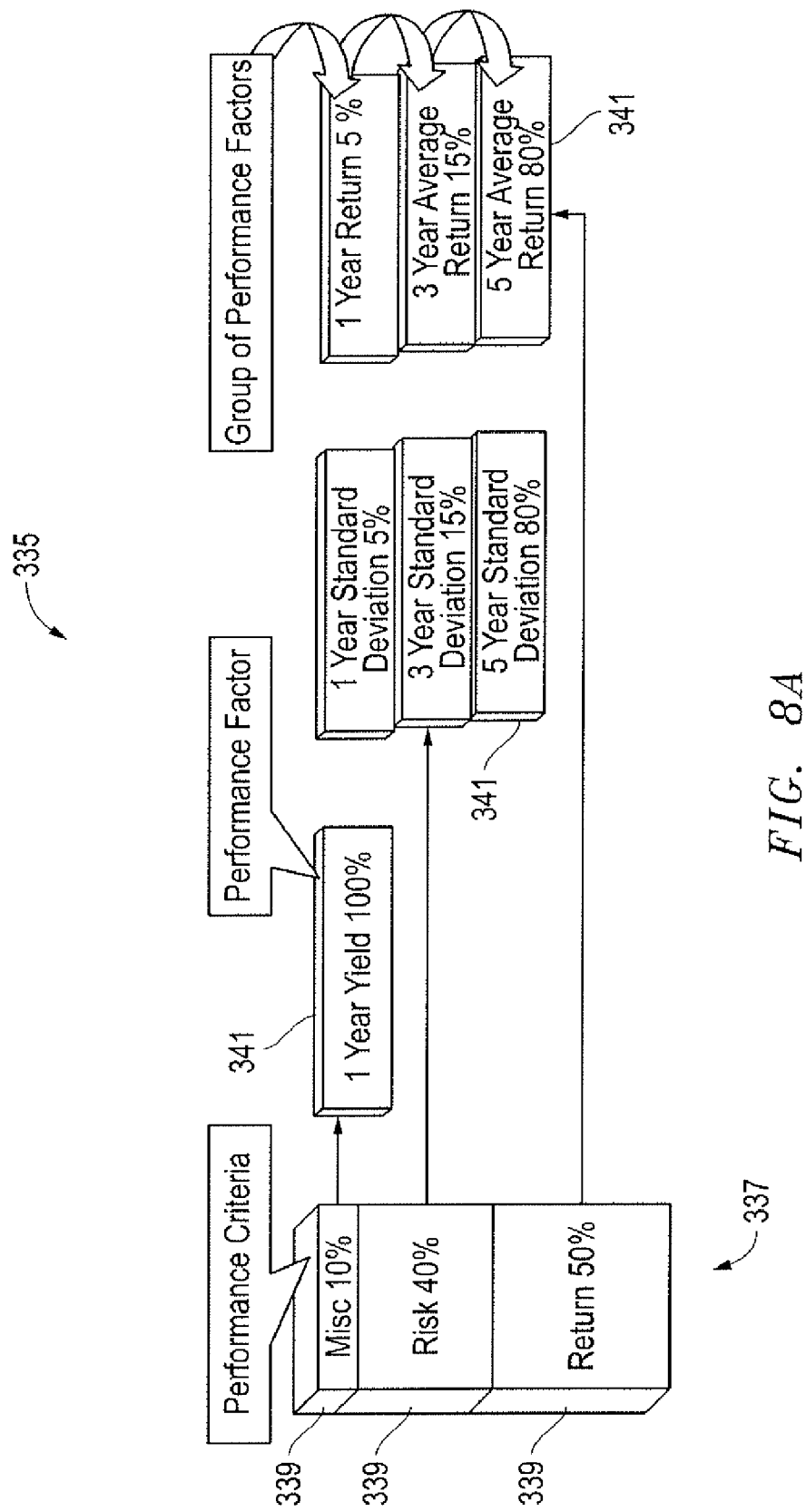
FIG. 8A depicts an embodiment of a weighting approach configured for facilitating a comparative performance assessment in accordance with the inventive disclosures made herein

FIG. 8A depicts an embodiment of a weighting approach 335 for facilitating a performance assessment in accordance with the inventive disclosures made herein. The weighting approach 335 depicts a manner in which a performance assessment of managers is performed within each of the asset classes and shows a relationship of performance criteria and performance factors that have been used. The multi-segment vertical bar 337 depicts a grouping of performance criteria 339 used in the assessment and the degree of influence (i.e., weighting) assigned to each grouping. Each one of the performance criteria 339 of the vertical bar 337 has one or more subtending performance factors 341 associated therewith. The performance factors 341 that relate to common performance criteria 339 subtend from that particular performance criteria 339, thus producing groupings of performance factors in some instances.

Weightings are individually assigned to the performance factors 341 and indicate how much influence each of the performance factors 341 has within its group. Increasing any one performance factor's weighting within a group results in a corresponding degrease in the weighting assigned to the one or more other performance factors in the group. In effect, the sum of all of the performance factor weightings within a group must always sum to 100%. The same applies to the sum of all of the weightings applied to the performance criteria 339 from which all of the performance factors 341 subtend.

Weighting of the various performance criteria 339 and performance factors 341 influence performance scores referred to herein. Specifically, each grouping of performance scores has a direct effect on a performance score. Because a 50% weighting has been applied to one of the performance criteria 339, that performance criteria will control 50% of a performance scale (e.g., 5 points of the 10-point scale). The individual performance factors 341 subtending from each performance criteria 339 have an indirect affect upon the performance score. That indirect affect is determined by multiplying the weight assigned to that performance factor 341 and the weight of the performance criteria 339 from which it subtends.

Figure 8B:
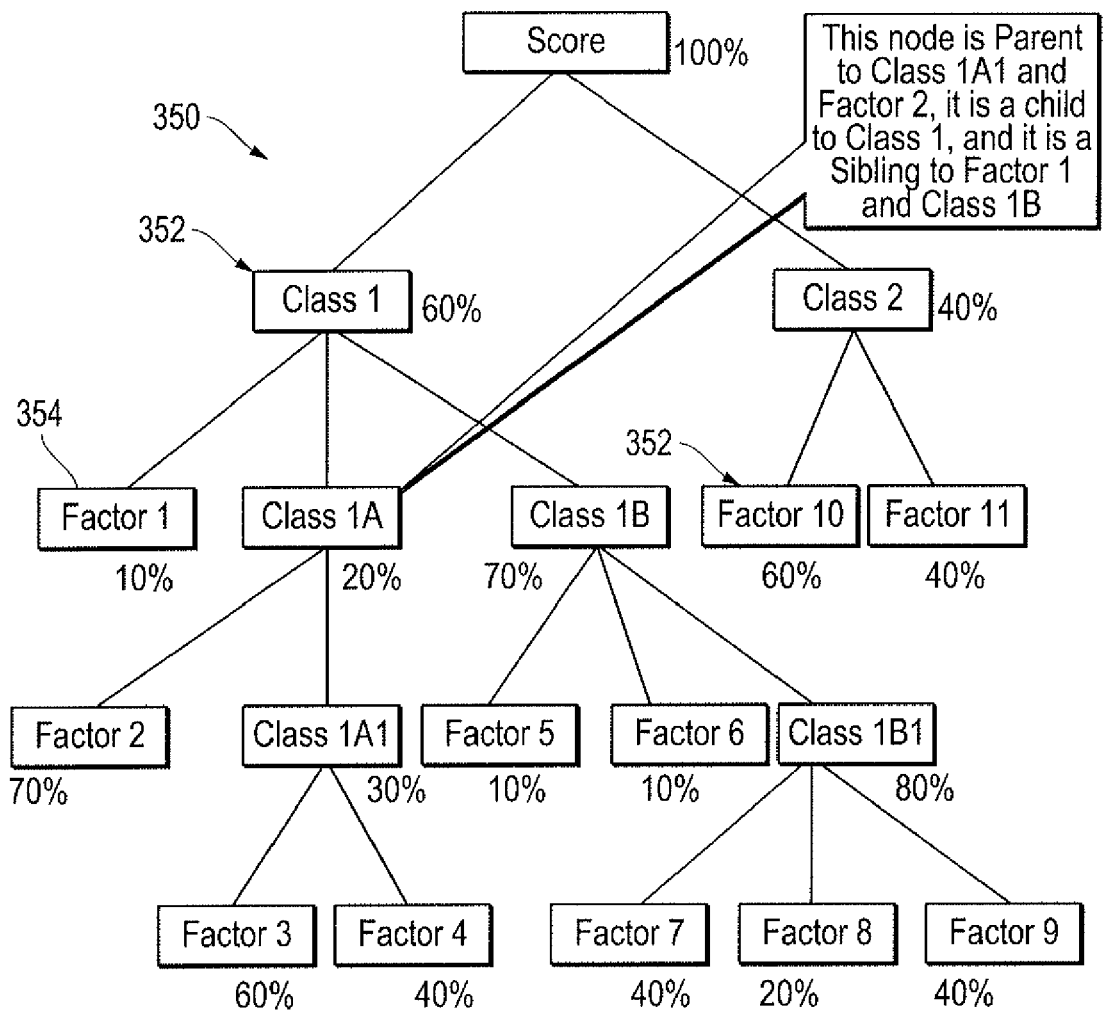
FIGS. 8B and 8C depict an embodiment of a hierarchical weightings structure in accordance with the inventive disclosures made herein.
Figure 8C:
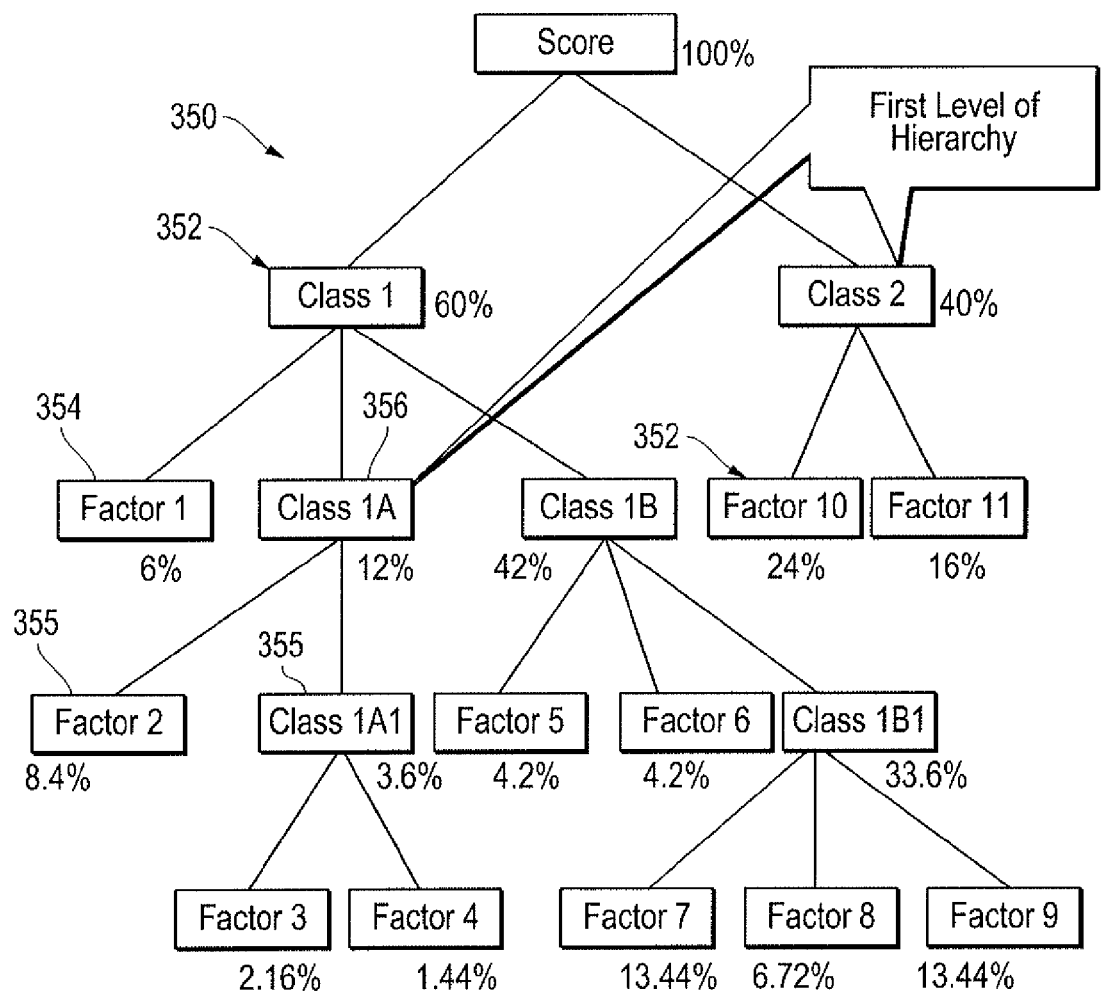

FIGS. 8B and 8C depict an embodiment of a hierarchical weightings structure that represents an approach for utilizing the weightings for determining performance scores. In effect, the weighting structure depicted in FIGS. 8B and 8C and the weighting approach 330 depicted in FIG. 8A accomplish the same objective and produce the same type of information. The difference is simply a matter of presentation.

The hierarchical structure includes a tree structure 350 where nodes 352 of the tree structure 350 are either classes or performance factors (depicted as 'factor' in FIGS. 8B and 8C). The tree structure 350 serves to distribute weightings to the performance factors. The weightings assigned to the performance factors define the potential impact that a performance factor may have on the scoring and ranking performed during an assessment (e.g., the comparative performance assessment discussed above) of investment information.

Performance factors are the 'leaves' of the tree and correspond directly to the performance data recorded in a corresponding dataset (i.e., investment performance information). Performance factors are always an end node 354 of any branch in the tree 350. As depicted in FIG. 8B, 'Class 1A' is a parent class node to 'Factor 2' (i.e., a child class node to 'Class 1A'), it is itself a child class node to 'Class 1' (i.e., the parent class node of 'Class 1A') and it is a sibling class node to 'Factor 1' and 'Class 1B' (i.e., the sibling class nodes of 'Class 1A').

Classes are groups of performance factors or some combination of performance factors and classes. Only classes may be parent class nodes, but they can also be child class nodes or sibling class nodes. Factors may never be parent class nodes, and may only be child class nodes or sibling class nodes. Nodes on the same hierarchal level that are assigned to the same parent class node, will add up to 100%. Or, if they do not add to 100%, they are reduced in order to sum up to 100% while maintaining the weighting relationship between the assigned performance factors and classes. The performance factors that are assigned to classes are typically similar or share some common theme. The purpose of the classes is to have a way to influence the relative weightings of all the subtending classes and performance factors that have a relationship to a parent class.

All nodes 352 within the tree 350 have an assigned and/or a calculated weight. These weights can be assigned via a template, by manual entry or, though some other type of decision process (e.g., that of the performance criteria decision engine disclosed herein). It is necessary to normalize the weightings of all of the nodes 352 to 100%, so that their weightings are relative to subtending parent class nodes. Once normalized into a relative weighting, an actual weighting can be calculated for each of the class nodes.

As depicted in FIG. 8C, actual weights are calculated based on the relative weightings of the nodes 352 in the weightings hierarchy. Actual weightings influence the scoring and ranking that takes place during an assessment of investment information. Each nodes relative weight is multiplied by the actual weight of its parent node, which produces the actual weight of each one of the nodes 352. The hierarchy is processed from the highest node in the tree 350 to the lowest nodes in the tree, because the actual weight of parent class nodes is required to calculate the actual weight of its children (i.e., child class nodes). The actual weightings are then applied to investment performance data to generate a corresponding factor performance score. These individual factor performance scores are then combined to produce a composite performance score.

Using a hierarchical weighting structure is advantageous in that it enables the effect of different weighting scales to be blended. Blending such scales through the use of weighting allows evaluation of performance factor values using various different scoring methods. For example, though such blending, blended investment index performance scores and a corresponding blended composite investment index performance score may be computed. As depicted in FIG. 8C, blended tree fragments 355 represent a plurality of performance factor weightings that sum to the weighting of a respective parent node 356.

Figure 9:
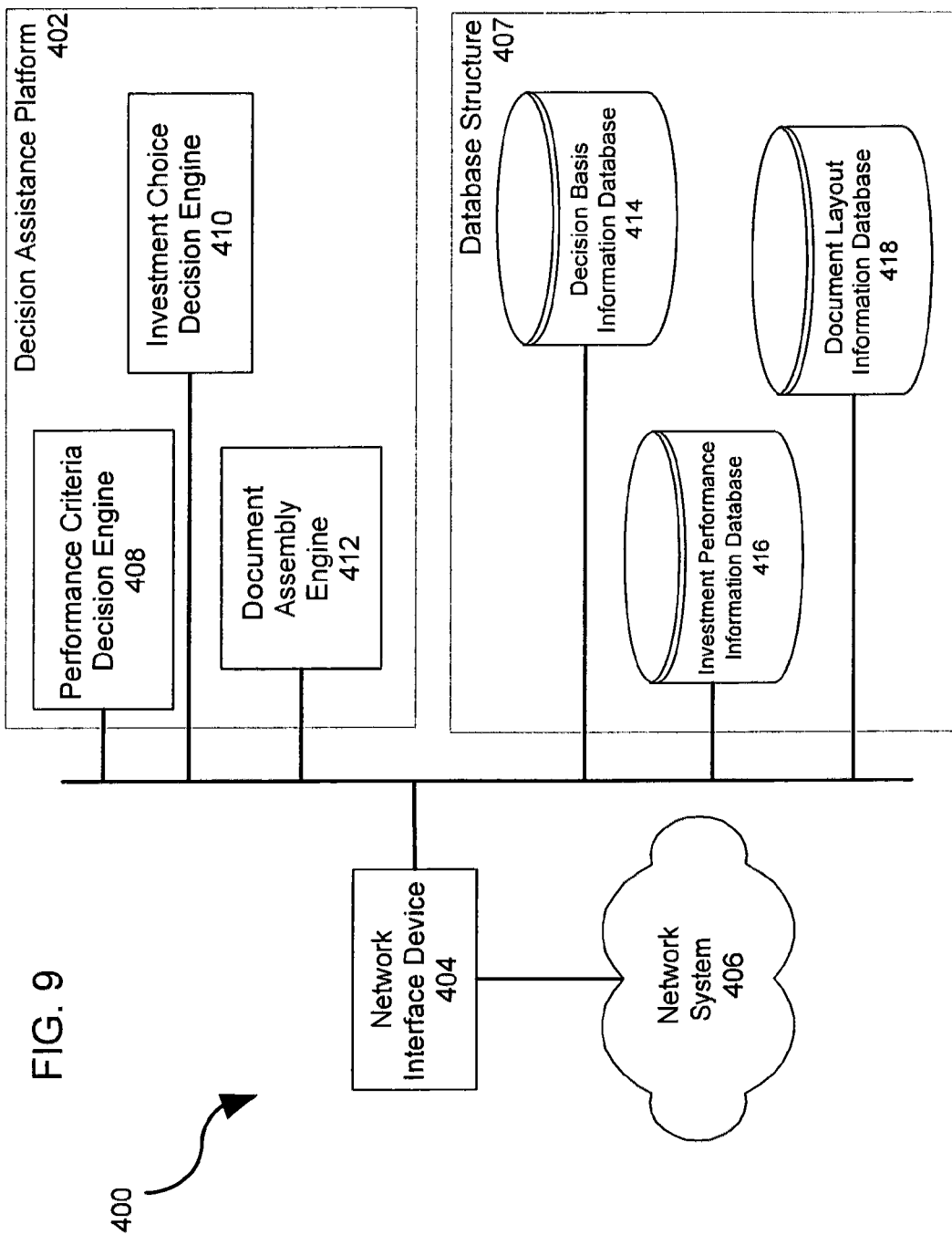
FIG. 9 depicts a network system configured for facilitating financial consulting services functionality in accordance with embodiments of the inventive disclosures made herein.

FIG. 9 depicts a network system 400 (i.e., a data processing system) configured for facilitating financial consulting services functionality in accordance with embodiments of the inventive disclosures made herein. The system 400 includes a decision-assistance platform 402, a network interface device 404 coupled to the decision-assistance platform 402, a network system 406 coupled to the network interface device 404. The decision assistance platform 402 comprises a database structure 407 accessible by the decision-assistance platform 402. Accordingly, communication of information between the decision-assistance platform 402 and other entities (e.g., a computer of a client, a computer of a financial services consultant, a computer capable of downloading investment performance information, etc) is enabled and accessibility of information required for carrying out such financial consulting services functionality is enabled (e.g., via accessing a website from which such functionality is accessible).

The decision-assistance platform 402 includes a performance criteria decision engine 408 (i.e., a first decision engine), an investment choice decision engine 410 (i.e., a second decision engine) and a document assembly engine 412. The performance criteria decision engine 408 is an example of a means for carrying out performance weighting factor computation functionality and/or specifying client profile information, as disclosed herein. Such client profile information can include information comprised by the client-specific template (e.g., logic conditional filters and/or processing instructions).

In at least one embodiment of the inventive disclosures made herein, the first decision engine is configured for facilitating input of initial allocation functionality (e.g., facilitating appropriate client-specific allocations of investments and investment effect parameters). The investment choice decision engine 410 is an example of a means for carrying out comparative scoring and ranking (i.e., quantification) of investment choices computation functionality as disclosed herein. A decision engine system of a decision assistance platform is defined herein to comprise the performance criteria decision engine and the investment choice decision engine. The document assembly engine 412 is an example of a means for carrying out document preparation/outputting functionality as disclosed herein. It is contemplated that the various engines may be physically embodied as separate or fully integrated software/hardware modules.

The database structure 407 includes a decision information database (which may include rules set) 414, an investment performance information database 416, and a client information and document layout information database 418. In at least one other embodiment, separate client information and document layout information databases are provided. Information (e.g., rules) upon which the decision assistance platform 402 is dependent for carrying out performance criteria decision functionality as disclosed herein is maintained in the decision information database 414. Information upon which the decision assistance platform 402 is dependent for carrying out scoring and ranking computation functionality (i.e., of investment choices) as disclosed herein is maintained in the investment performance information database 416. Information upon which the decision assistance platform 402 is dependent for carrying out document preparation/outputting functionality as disclosed herein is maintained in the client information and document layout information database 418.

It is disclosed herein that, in at least one embodiment of the inventive disclosures made herein, the decision assistance platform 402 is not a physically distinct apparatus or system. Rather, in such at least one embodiment, the decision assistance platform 402 is a functional platform comprised by functionality imparted across a plurality of systems or system components (e.g., discrete functional blocks linked via a network system). Accordingly, it is disclosed herein that system elements configured for imparting such functionality may be or may not be located at a common location and may or may not reside on a common computer.

It is disclosed herein that, in at least one embodiment of the inventive disclosures made herein, the decision assistance platform 402 comprises a single decision engine (e.g., a single data processing program) configured for facilitating all or a portion of the functionality of the 408, an investment choice decision engine 410 and a document assembly engine 412. In one example, a single decision engine program running on a suitable data processing system facilitates all or a portion of the functionality of the performance criteria decision engine 408, an investment choice decision engine 410, and a document assembly engine 412 via a single data processing program. In another example, a single decision engine is fashioned to include various functional modules that interact to facilitate all or a portion of the functionality of the performance criteria decision engine 408, an investment choice decision engine 410 and a document assembly engine 412.

Referring now to computer readable medium in accordance with embodiments of the inventive disclosures made herein, methods as disclosed herein are tangibly embodied by computer readable medium having instructions thereon for carrying out such methods. In one specific example, instructions are provided for carrying out the various operations of the method 100 depicted in FIGS. 2A and 2B for facilitating financial consulting services. The instructions may be accessible by the decision-assistance platform from a memory apparatus of the decision assistance platform (e.g. RAM, ROM, virtual memory, hard drive memory, etc), from an apparatus readable by a drive unit of the decision assistance platform (e.g., a diskette, a compact disk, a tape cartridge, etc) or both. Examples of computer readable medium include a compact disk or a hard drive, which has imaged thereon a computer program for carrying out financial consulting services functionality in accordance with embodiments of the inventive disclosures made herein.

Although the discussion of method and systems in accordance with embodiments of the inventive disclosures made herein have been presented thus far in view of financial utility to investors, it is contemplated that such methods and systems may be configured specifically for providing utility in the areas of commercial and residential lending, venture capital funding, investment banking services. Furthermore, it is contemplated that such methods and systems may be configured for providing utility beyond financial services. Specifically, embodiments of the decision-assistance platform functionality disclosed herein may be applied in applications other than financial services. Retail e-commerce applications, market research applications, human resource applications, dating services and raw material procurement are examples of such applications where an objective and unbiased scoring and ranking assessment of all available choices (i.e., within any universe of choices, the differences among them which may be quantified) functionality, consistent with a client's (or consumer's) individual needs, goals and/or desires, provided by the decision-assistance platform functionality are useful.

The inventive disclosures made herein relate to facilitating financial consulting services. Methods and equipment in accordance with embodiments of the inventive disclosures made herein are configured for enabling quantitatively ranked investment choices to be offered to clients by trusted advisers (e.g., attorneys, lawyers, siblings, community bankers, and the like) who are not necessarily professionals within the traditional financial services industry. The trusted advisor is thus armed with the knowledge to coordinate all of their clients' financial services needs, not as product salespeople, but in their traditional role as the providers of independent advice. In doing so, the client is provided with an increased level of trust with respect to the financial information being provided and the person providing the financial information.

Methods in accordance with embodiments of the inventive disclosures made herein and system configured for carrying out such methods provide trusted advisors having access to such methods (i.e., affiliated trusted advisors) with a proprietary support arrangement including a decision assistance platform. The proprietary decision assistance platform enables the affiliated trusted advisors to advise their clients and to coordinate solutions to their needs, outsourcing the responsibility of product research, comparative assessment, implementation and acquisition. This unique outsourcing structure creates significant efficiencies and allows affiliated trusted advisors to largely confine their time to meeting with and advising their clients, which is the most important and best use of their time. It eliminates the need to refer clients away to brokers, insurance agents, and other product salespeople, allowing the affiliated trusted advisor to retain a large portion of revenues that they have traditionally referred away to such brokers, agents and salespeople.

Furthermore, methods and systems in accordance with embodiments of the inventive disclosures made herein are designed to address a number of increasingly important and troubling trends that both consumers and professional advisory firms are now facing. The growing complexity and range of available choices is creating increasing uncertainty and stress among clients and their advisors (i.e., those individuals trying to help them make informed decisions with regard to product selection), and is increasing the need for unbiased, trustworthy advice. As the range of available choices continues to proliferate and as the volume and complexity of information about them continues to grow, many investors simply do not have the time to become knowledgeable about what their choices are, much less having the time and the ability to confidently choose from among them. In essence, many investors no longer have the time or individual ability to be able to discern what is truly "best" for them and their families relative to investment choices.

With rapidly expanding access to an increasingly diverse array of financial products and service choices—as well as increasingly voluminous and complex information about such choices—consumers increasingly need help in objectively analyzing the universe of available investment choices in order to feel secure that they have done "the best" for themselves and their families. Embodiments of the inventive disclosures made herein provide solution to increasingly broad needs for objective, trustworthy advice. The significance of this solution will continue to grow in parallel with the growth and development of the knowledge-based economy and e-commerce. With proper methodologies, training, technological tools and support, affiliated trusted advisors who already possess the greatest degree of client trust will be able to successfully meet this expanding client need for more broad ranging, objective advice with respect to financial products.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for providing a core-satellite analysis of investment choices, comprising:
    at least one data processing device of a data computing system accessing, from memory coupled to said at least one data processing device, instructions causing said at least one data processing device to determine a first set of said investment choices, wherein each one of said investment choices in the first set of said investment choices is within at least one asset class of a defined set of asset classes, wherein causing said at least one data processing device to determine the first set of said investment choices includes causing said at least one data processing device to determine ones of said investment choices having a filter function metric value that falls inside both an upper limit and a lower limit of a filter function metric value range defined by a range filter structure, wherein lower and upper filter function metric values determined by the range filter structure vary with time in response to the filter function metric value of a benchmark investment choice varying over time such that the filter function metric value range defined by the range filter structure varies in conjunction therewith, wherein the filter function metric value range is derived as a function of a plurality of filter parameter sets each defined within the range filter structure, wherein each one of said filter parameter sets includes a filter function type, a filter function metric associated with the filter type, a first filter function condition upon which the filter function metric is applied, and a first filter function metric value corresponding to the filter function metric, and wherein the filter function metric value of each one of said investment choices of the first set of said investment choices and the filter function metric value of the benchmark investment choice are all determined as a function of a particular filter function metric;
    said at least one data processing device accessing, from said memory, instructions causing said at least one data processing device to determine a second set of said investment choices, wherein each one of said investment choices in the second set of said investment choices is within said at least one asset class, wherein causing said at least one data processing device to determine the second set of said investment choices includes causing said at least one data processing device to determine ones of said investment choices having a filter function metric value that falls outside of at least on of the upper limit and the lower limit of the filter function metric value range defined by the range filter structure and wherein the filter function metric value of each one of said investment choices of the second set of said investment choices and the filter function metric value of the benchmark investment choice are all determined as a function of the particular filter function metric; and
    said at least one data processing device accessing, from said memory, instructions causing said at least one data processing device to perform a comparative assessment of each one of said sets of investment choices, wherein causing said at least one data processing device to perform the comparative assessment of each one of said sets of investment choices includes causing said at least one data processing device to determine a comparative assessment value for each one of said investment choices thereof.

2. The method of claim 1 wherein the filter function metric value is a filter function metric value that quantifies volatility of a respective one of said investment choices.

3. The method of claim 1 wherein the benchmark investment choice is an investment index.

4. The method of claim 1 wherein the comparative assessment value for each one of said investment choices is determined using at least the filter function metric value thereof.

5. The method of claim 1 wherein:
    causing said at least one data processing device to determine the first set of said investment choices includes causing said at least one data processing device to determine ones of said investment choices having a filter function metric value that falls within both of the upper limit and the lower limit of the filter function metric value range defined by the range filter structure; and
    causing said at least one data processing device to determine the second set of said investment choices includes causing said at least one data processing device to determine ones of said investment choices having a filter function metric value that falls outside of at least one of the upper limit and the lower limit of the filter function metric value range defined by the dynamic range filter structure.

6. The method of claim 5 wherein the filter function metric value is a filter function metric value that quantifies volatility of a respective one of said investment choices.

7. The method of claim 5 wherein:
    the benchmark investment choice is an investment index; and
    the comparative assessment value for each one of said investment choices is determined using at least the filter function metric value thereof.

8. The method of claim 1 wherein said at least one parameter used for deriving the filter function metric value range includes a filter function metric of the benchmark investment choice.

9. The method of claim 8 wherein the filter function metric of the benchmark investment choice is a filter function metric defining a level of volatility of the benchmark investment choice.

10. The method of claim 9 wherein:
    the benchmark investment choice is an investment index; and
    the comparative assessment value for each one of said investment choices is determined using at least the filter function metric value thereof.

* * * * *